United States Patent
Yapici et al.

(10) Patent No.: US 12,232,053 B2
(45) Date of Patent: Feb. 18, 2025

(54) POWER CONTROL FOR TRANSMISSIONS WITH TIME-BASED ARTIFICIAL NOISE

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 18/061,376

(22) Filed: Dec. 2, 2022

(65) Prior Publication Data

US 2024/0188006 A1 Jun. 6, 2024

(51) Int. Cl.
*H04W 52/36* (2009.01)
*H04W 12/033* (2021.01)
*H04W 52/24* (2009.01)

(52) U.S. Cl.
CPC ....... *H04W 52/367* (2013.01); *H04W 12/033* (2021.01); *H04W 52/241* (2013.01)

(58) Field of Classification Search
CPC ............. H04W 52/367; H04W 12/033; H04W 52/241; H04L 1/08; H04L 5/0053; H04L 5/0048
See application file for complete search history.

(56) References Cited

U.S. PATENT DOCUMENTS

| | | | |
|---|---|---|---|
| 6,661,835 B1* | 12/2003 | Sugimoto | H04B 1/71075 375/348 |
| 2017/0302352 A1* | 10/2017 | Islam | H04W 72/21 |
| 2021/0143957 A1* | 5/2021 | Gao | H04L 5/0044 |
| 2022/0014252 A1* | 1/2022 | Harrison | H04B 7/0617 |
| 2023/0198597 A1* | 6/2023 | Zhou | H04L 1/0001 375/262 |
| 2023/0239911 A1* | 7/2023 | Yang | H04W 72/542 370/329 |

FOREIGN PATENT DOCUMENTS

CN 102158459 A 8/2011

OTHER PUBLICATIONS

International Search Report and Written Opinion—PCT/US2023/078567—ISA/EPO—Mar. 6, 2024 (2203736WO).

* cited by examiner

*Primary Examiner* — J. Brant Murphy
(74) *Attorney, Agent, or Firm* — Holland & Hart LLP

(57) ABSTRACT

Methods, systems, and devices for wireless communications are described. A network entity may apply pseudo-noise signals to repetitions of a first signal to obtain a set of second signals and transmit each of the set of second signals to a user equipment (UE) during a respective set of different time intervals. Each of the pseudo-noise signals may be associated with a gain and phase parameter, and may be based on a channel state information (CSI) associated with a channel for communications with the UE over the respective time interval. Each gain parameter may cause a power level of the pseudo-noise signal to be within a defined range, and a gain and phase parameter associated with a pseudo-noise signal applied to a subsequent repetition of the first signal may be based on another gain and phase parameter associated with another phase-noise signal applied to a previous repetition of the first signal.

30 Claims, 18 Drawing Sheets

POWER CONTROL FOR TRANSMISSIONS WITH TIME-BASED ARTIFICIAL NOISE

FIELD OF TECHNOLOGY

The following relates to wireless communications, including power control for transmissions with time-based artificial noise.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, wireless devices may communicate data, control information, or both. For example, a network entity may transmit a control channel transmission (e.g., a physical downlink control channel (PDCCH) transmission) or a data channel transmission (e.g., a physical downlink shared channel (PDSCH) transmission) to a UE. But in some cases, an unauthorized device may attempt to receive and decode the communications. Additionally, or alternatively, the unauthorized device may attempt malicious activities (e.g., may attempt to corrupt or modify the communications), which may result in a lack of confidentiality and integrity of the communications, relatively inefficient communications, and the like.

SUMMARY

The described techniques relate to improved methods, systems, devices, and apparatuses that support power control for transmissions with time-based artificial noise. For example, the described techniques provide for a transmitting device to apply pseudo-noise (e.g., artificial noise (AN)) to each repetition of a transmission, and due to the pseudo-noise being generated based on channel state information (CSI) associated with a channel between the transmitting device and the authorized receiving device, the authorized receiving device may successfully soft combine and decode the transmissions.

To generate a pseudo-noise signal that has a power level that is large enough to adequately protect the transmission but small enough that the device is able to efficiently transmit the pseudo-noise signal, the transmitting device may generate the pseudo-noise signal using a gain parameter that causes the pseudo-noise signal to have a power level that is within a defined power range. Additionally, to enable an authorized receiving device to soft combine and decode the transmission, the device may generate the pseudo-noise signal using a phase parameter (e.g., to compensate for various magnitudes of the gain parameters). Further, the transmitting device may transmit each repetition during different (e.g., nonoverlapping) time intervals. Here, the receiving device may receive each repetition over the different time intervals and soft combine the repetitions to decode the transmission. In some cases, the channel between the devices may be time-varying and the transmitting device may therefore not have estimated a future CSI yet when transmitting a repetition. Accordingly, the transmitting device may select gain and phase parameters associated with pseudo-noise signals based on both a current estimation of the channel as well as gain and phase parameters associated with pseudo-noise signals applied to previous repetitions of the transmission, which may enable the transmitting device to apply pseudo-noise signals to the repetitions of the transmission that an authorized receiving device is able to soft combine and decode.

A method for wireless communication at a network entity is described. The method may include receiving a first reference signal from a user equipment (UE) over a first time interval, applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval, and transmitting the second signal to the UE over a third time interval occurring after the first time interval.

An apparatus for wireless communication at a network entity is described. The apparatus may include a processor, memory coupled with the processor, and instructions stored in the memory. The instructions may be executable by the processor to cause the apparatus to receive a first reference signal from a UE over a first time interval, apply a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval, and transmit the second signal to the UE over a third time interval occurring after the first time interval.

Another apparatus for wireless communication at a network entity is described. The apparatus may include means for receiving a first reference signal from a UE over a first time interval, means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval, and means for transmitting the second signal to the UE over a third time interval occurring after the first time interval.

A non-transitory computer-readable medium storing code for wireless communication at a network entity is described. The code may include instructions executable by a processor to receive a first reference signal from a UE over a first time interval, apply a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval, and transmit the second signal to the UE over a third time interval occurring after the first time interval.

In some examples of the method, apparatuses, and non-transitory computer-readable medium described herein, a first power level of the first pseudo-noise signal may be based on the first gain parameter and the first gain parameter may be based on the first power level of the first pseudo-noise signal being greater than a first defined power level and less than a second defined power level.

In some examples of the method, apparatuses, and non-transitory computer-readable medium described herein, the first gain parameter may be equal to the second gain parameter based on the first power level of the first pseudo-noise signal being greater than the first defined power level and less than the second defined power level when the first gain parameter may be equal to the second gain parameter.

In some examples of the method, apparatuses, and non-transitory computer-readable medium described herein, the first phase parameter may be further based on a third gain parameter and a third phase parameter of a third pseudo-noise signal applied to a third repetition of the first signal to obtain a fourth signal that may be transmitted to the UE over a fourth time interval occurring prior to the first time interval.

Some examples of the method, apparatuses, and non-transitory computer-readable medium described herein may further include operations, features, means, or instructions for receiving, after transmitting the second signal to the UE, a second reference signal from the UE, applying a third pseudo-noise signal to a third repetition of the first signal to obtain a fourth signal, where the third pseudo-noise signal may be based on a second estimated CSI corresponding to the second reference signal, a third gain parameter equal to the first gain parameter and the second gain parameter, and a third phase parameter that may be based on the first phase parameter and the second phase parameter, and transmitting the fourth signal to the UE.

In some examples of the method, apparatuses, and non-transitory computer-readable medium described herein, the first gain parameter may be different than the second gain parameter based on a second power of the first pseudo-noise signal being less than the first defined power level or greater than the second defined power level when the first gain parameter may be equal to the second gain parameter.

In some examples of the method, apparatuses, and non-transitory computer-readable medium described herein, the second pseudo-noise signal applied to the third signal may be based on a second estimated CSI corresponding to a second reference signal received from the UE and the first phase parameter may be based on whether a first power level of the first reference signal may be within a threshold amount of a second power level of the second reference signal.

In some examples of the method, apparatuses, and non-transitory computer-readable medium described herein, the second pseudo-noise signal applied to the third signal may be based on a second estimated CSI corresponding to a second reference signal received from the UE and the first gain parameter and the first phase parameter may be based on the second gain parameter and the second phase parameter of the second reference signal based on a correlation of the first estimated CSI and the second estimated CSI being less than a threshold.

Some examples of the method, apparatuses, and non-transitory computer-readable medium described herein may further include operations, features, means, or instructions for transmitting, to the UE, signaling requesting for the UE to transmit the first reference signal over the first time interval, where receiving the first reference signal from the UE may be based on transmitting the signaling.

In some examples of the method, apparatuses, and non-transitory computer-readable medium described herein, the second pseudo-noise signal applied to the third signal may be based on a second estimated CSI corresponding to a second reference signal received from the UE and transmitting the signaling requesting for the UE to transmit the first reference signal over the first time interval may be based on a predicted correlation between the first estimated CSI and the second estimated CSI being less than a threshold.

In some examples of the method, apparatuses, and non-transitory computer-readable medium described herein, the second pseudo-noise signal applied to the third signal may be based on a second estimated CSI corresponding to a second reference signal received from the UE and the first reference signal and the second reference signal may be received via different frequency resources, different beam configurations at the network entity, or both based on a correlation between the second estimated CSI and a third predicted CSI corresponding to a third reference signal received from the UE over the first time interval via a same set of frequency resources and a same beam configuration as the second reference signal being greater than a threshold.

In some examples of the method, apparatuses, and non-transitory computer-readable medium described herein, the second pseudo-noise signal applied to the third signal may be based on a second estimated CSI corresponding to a second reference signal received from the UE and the first reference signal and the second reference signal may be received via a same set of frequency resources and via a same beam configuration at the network entity.

Some examples of the method, apparatuses, and non-transitory computer-readable medium described herein may further include operations, features, means, or instructions for transmitting, to the UE and based on transmitting the second signal, signaling indicating that the second signal and the third signal may be repetitions of the first signal.

A method for wireless communication at a UE is described. The method may include receiving a first reference signal from a network entity over a first time interval, applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval, and transmitting the second signal to the network entity over a third time interval occurring after the first time interval.

An apparatus for wireless communication at a UE is described. The apparatus may include a processor, memory coupled with the processor, and instructions stored in the memory. The instructions may be executable by the processor to cause the apparatus to receive a first reference signal from a network entity over a first time interval, apply a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval, and transmit the second signal to the network entity over a third time interval occurring after the first time interval.

Another apparatus for wireless communication at a UE is described. The apparatus may include means for receiving a first reference signal from a network entity over a first time interval, means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval, and means for transmitting the second signal to the network entity over a third time interval occurring after the first time interval.

A non-transitory computer-readable medium storing code for wireless communication at a UE is described. The code may include instructions executable by a processor to receive a first reference signal from a network entity over a first time interval, apply a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval, and transmit the second signal to the network entity over a third time interval occurring after the first time interval.

In some examples of the method, apparatuses, and non-transitory computer-readable medium described herein, a first power level of the first pseudo-noise signal may be based on the first gain parameter and the first gain parameter may be based on the first power level of the first pseudo-noise signal being greater than a first defined power level and less than a second defined power level.

In some examples of the method, apparatuses, and non-transitory computer-readable medium described herein, the first gain parameter may be equal to the second gain parameter based on the first power level of the first pseudo-noise signal being greater than the first defined power level and less than the second defined power level when the first gain parameter may be equal to the second gain parameter.

In some examples of the method, apparatuses, and non-transitory computer-readable medium described herein, the first phase parameter may be further based on a third gain parameter and a third phase parameter of a third pseudo-noise signal applied to a third repetition of the first signal to obtain a fourth signal that may be transmitted to the network entity over a fourth time interval occurring prior to the first time interval.

Some examples of the method, apparatuses, and non-transitory computer-readable medium described herein may further include operations, features, means, or instructions for receiving, after transmitting the second signal to the network entity, a second reference signal from the network entity, applying a third pseudo-noise signal to a third repetition of the first signal to obtain a fourth signal, where the third pseudo-noise signal may be based on a second estimated CSI corresponding to the second reference signal, a third gain parameter equal to the first gain parameter and the second gain parameter, and a third phase parameter that may be based on the first phase parameter and the second phase parameter, and transmitting the fourth signal to the network entity.

In some examples of the method, apparatuses, and non-transitory computer-readable medium described herein, the first gain parameter may be different than the second gain parameter based on a second power of the first pseudo-noise signal being less than the first defined power level or greater than the second defined power level when the first gain parameter may be equal to the second gain parameter.

In some examples of the method, apparatuses, and non-transitory computer-readable medium described herein, the second pseudo-noise signal applied to the third signal may be based on a second estimated CSI corresponding to a second reference signal received from the network entity and the first phase parameter may be based on whether a first power level of the first reference signal may be within a threshold amount of a second power level of the second reference signal.

In some examples of the method, apparatuses, and non-transitory computer-readable medium described herein, the second pseudo-noise signal applied to the third signal may be based on a second estimated CSI corresponding to a second reference signal received from the network entity and the first gain parameter and the first phase parameter may be based on the second gain parameter and the second phase parameter of the second reference signal based on a correlation of the first estimated CSI and the second estimated CSI being less than a threshold.

Some examples of the method, apparatuses, and non-transitory computer-readable medium described herein may further include operations, features, means, or instructions for transmitting, to the network entity, signaling requesting for the network entity to transmit the first reference signal over the first time interval, where receiving the first reference signal from the network entity may be based on transmitting the signaling.

In some examples of the method, apparatuses, and non-transitory computer-readable medium described herein, the second pseudo-noise signal applied to the third signal may be based on a second estimated CSI corresponding to a second reference signal received from the network entity and transmitting the signaling requesting for the network entity to transmit the first reference signal over the first time interval may be based on a predicted correlation between the first estimated CSI and the second estimated CSI being less than a threshold.

In some examples of the method, apparatuses, and non-transitory computer-readable medium described herein, the second pseudo-noise signal applied to the third signal may be based on a second estimated CSI corresponding to a second reference signal received from the network entity and the first reference signal and the second reference signal may be received via different frequency resources, different beam configurations at the UE, or both based on a correlation between the second estimated CSI and a third predicted CSI corresponding to a third reference signal received from the network entity over the first time interval via a same set of frequency resources and a same beam configuration as the second reference signal being greater than a threshold.

In some examples of the method, apparatuses, and non-transitory computer-readable medium described herein, the second pseudo-noise signal applied to the third signal may be based on a second estimated CSI corresponding to a second reference signal received from the network entity and the first reference signal and the second reference signal may be received via a same set of frequency resources and via a same beam configuration at the UE.

Some examples of the method, apparatuses, and non-transitory computer-readable medium described herein may further include operations, features, means, or instructions for transmitting, to the network entity and based on transmitting the second signal, signaling indicating that the second signal and the third signal may be repetitions of the first signal.

DETAILED DESCRIPTION

Figure 1:
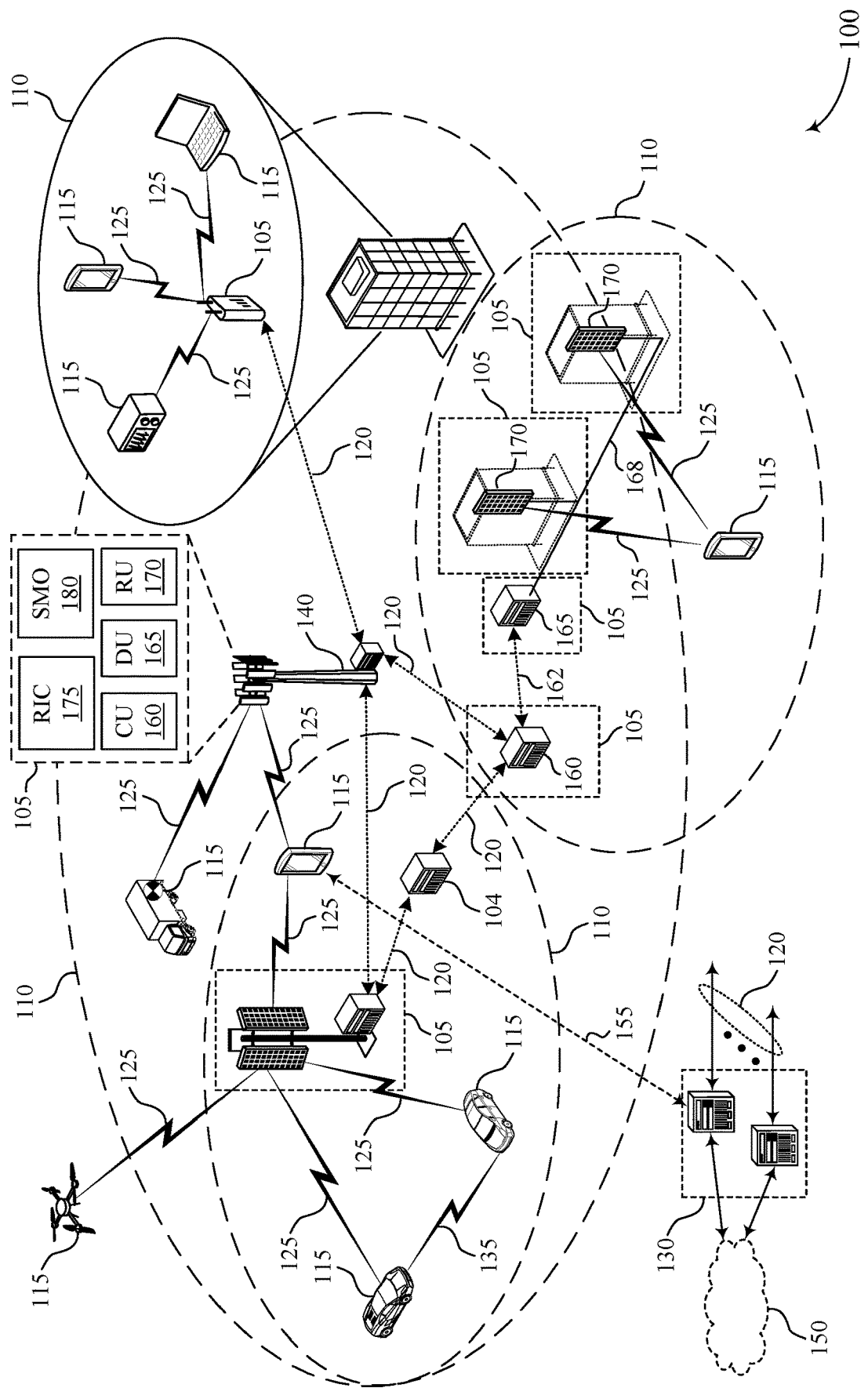
FIGS. 1 and 2 illustrate examples of wireless communications systems that support power control for transmissions with time-based artificial noise in accordance with one or more aspects of the present disclosure.

Some wireless communication systems may support communications of control information or data between devices (e.g., between a network entity and a user equipment (UE)). In some cases, to introduce security and protection for transmissions (e.g., physical downlink control channel (PDCCH) transmissions, physical downlink shared channel (PDSCH) transmissions, physical uplink control channel (PUCCH) transmission, physical uplink shared channel (PUSCH) transmissions), a device may transmit the transmission with a pseudo-noise injection. For example, the device may apply pseudo-noise (e.g., artificial noise (AN)) to each repetition of the transmission, and due to the pseudo-noise being generated based on channel state information (CSI) associated with a channel between the transmitting device and the authorized receiving device, the authorized receiving device may successfully soft combine and decode the transmissions (e.g., the pseudo-noise may be self-canceling at the authorized receiving device). In some examples, the transmitting device may transmit each repetition during a different time interval. The receiving device may receive each repetition over the different time intervals and soft combine the repetitions to decode the transmission.

In some cases, a power of a pseudo-noise signal may be inversely proportional to a metric of the channel between the two devices (e.g., corresponding to a received power of a reference signal transmitted via the channel). Here, if the channel is associated with relatively high power, the power of the pseudo-noise may be relatively low and may not provide adequate protection for transmissions (e.g., unauthorized receiving devices may decode the underlying transmissions). Additionally, if the channel is associated with relatively low power, the power of the pseudo-noise may be relatively high and transmitting the pseudo-noise signal may consume a large amount of power (e.g., an amount of power that is inefficient, an amount of power that is unsupportable by the transmitting device).

Accordingly, techniques described herein may support a device generating a pseudo-noise signal with a power level that is within a defined range (e.g., having a power that is greater than a first, minimum power level and less than a second, maximum power level). For example, the device may generate a pseudo-noise signal using a gain parameter that is directly proportional to a power level of the channel, bounded by the first and second power levels. Thus, the device may select the gain parameter based on an estimated power of the channel to ensure that the power level of the pseudo-noise signal falls between the first power level and the second power level. Additionally, to enable an authorized receiving device to soft combine and decode the transmission, the device may generate the pseudo-noise signal using a phase parameter.

In particular, to generate a first pseudo-noise signal applied to a first repetition of a signal, the device may use a gain parameter that causes a power level of the first pseudo-noise signal to fall between the first power level and the second power level based on an estimation of the channel at a first time. Additionally, the device may use a random phase parameter to generate the first pseudo-noise signal. Then, to generate a second pseudo-noise signal applied to a subsequent repetition of the signal under varying channel conditions, the device may use a gain parameter that both causes a power level of the second pseudo-noise signal to fall between the first and second power level (e.g., based on a second estimation of the channel at a second, later time) and enables the authorized receiving device to soft combine and decode the transmission. Additionally, the device may select a second phase parameter to generate the second pseudo-noise signal that enables the authorized receiving device to soft combine and decode the transmission based on the first gain parameter, the first phase parameter, and the second gain parameter (e.g., the pseudo-noise in the first repetition and the pseudo-noise in the subsequent repetition may be self-canceling at the receiver). The device may continue selecting gain and phase parameters for generating pseudo-noise signals to apply to subsequent repetitions of the transmission such that the power levels of the pseudo-noise signals fall within the defined power level range and the authorized receiving device is able to soft combine the repetitions and decode the transmission.

Aspects of the disclosure are initially described in the context of wireless communications systems. Aspects of the disclosure are than described in context of a communication scheme, pseudo-noise signal parameter configurations, a flowchart, and a process flow. Aspects of the disclosure are further illustrated by and described with reference to apparatus diagrams, system diagrams, and flowcharts that relate to power control for transmissions with time-based artificial noise.

FIG. 1 illustrates an example of a wireless communications system 100 that supports power control for transmissions with time-based artificial noise in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support power control for transmissions with time-based artificial noise as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI)

may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some instances of other wireless communications systems 100, devices may transmit signals without any security or protection. For example, a device (e.g., a network entity 105, a UE 115, a base station 140) may transmit a PDCCH or a PUCCH transmission without any security or protection measures. In some other instances of wireless communications systems 100, devices may rely on AN cancellation to provide security directly in the PHY layer. For example, a transmitting device may apply pseudo-noise signals to repetitions of a PDCCH or a PUCCH transmission, which may add security and protection to the PDCCH or the PUCCH transmission. Then, a receiving device may soft combine the repetitions of the PDCCH or the PUCCH transmission and decode the PDCCH or the PUCCH transmission. Equation 1 illustrates an example definition of a first AN (e.g., the pseudo-noise signal $\beta_1$) applied to a first repetition of a signal $x_1$ and Equation 2 illustrates an example definition of a second AN (e.g., the pseudo-noise signal $\beta_2$) applied to a second repetition of a signal $x_2$.

$$\beta_1 = \frac{u}{|h|^2} \quad (1)$$

$$\beta_2 = -\frac{u}{|h|^2} \quad (2)$$

In the example of Equations 1 and 2, u may correspond to a noise vector that may reduce (e.g., minimize) a peak-to-average-power ratio (PAPR). For example, u may be a noise vector that results in a PAPR that satisfies a threshold. Additionally, h may correspond to a channel gain (e.g., a power of the channel). Equation 3 illustrates an example of the signal generated based on applying the pseudo-noise signal $\beta_1$ to the signal $x_1$ (e.g., the signal including the first repetition of a message or packet) and Equation 4 illustrates an example of the signal generated based on applying the pseudo-noise signal $\beta_2$ to the signal $x_2$ (e.g., the signal including the second repetition of a message or packet).

$$y_1 = \tilde{h}(x_1 + \beta_1) + z_1 \quad (3)$$

$$y_2 = \tilde{h}(x_2 + \beta_2) + z_2 \quad (4)$$

In the example of Equations 3 and 4, h may correspond to an estimated channel gain (e.g., a power of the channel estimated by the transmitting device that corresponds to CSI of the channel) and z may correspond to observation noise. Equation 5 illustrates an example of a combination of each received signal y at the receiving device.

$$y = \tilde{h}^* y_1 + \tilde{h}^* y_2 = \tilde{h}^* \tilde{h}(x_1 + \beta_1) + \tilde{h}^* \tilde{h}(x_2 + \beta_2) + z \quad (5)$$

$$= |\tilde{h}|^2 (x_1 + x_2) + |\tilde{h}|^2 \beta_1 + |\tilde{h}|^2 \beta_2 + z$$

In the example of Equation 5, any receiving device may eliminate the pseudo-noise signal (e.g., the AN interference) if each individual pseudo-noise signal $\beta_1$ and $\beta_2$ are not generated using different CSIs. That is, the term $|\tilde{h}|^2 \beta_1 + |\tilde{h}|^2 \beta_2$ from Equation 5 may be equal to 0 (e.g., vanish) even in cases that $\tilde{h} \neq h$, which may occur in instances that a receiving device is not the authorized receiving device and is unable to determine a value of the CSI (e.g., corresponding to h). Thus, in order for a transmitting device to secure or protect repetitions of a signal using pseudo-noise signals, a CSI diversity across message copies may be above a threshold (e.g., a CSI for each repetition may be different).

Equations 1 and 2 may be examples where a power control for AN cancellation is based on an absolute channel inversion. That is, a magnitude of the power of the pseudo-noise signals $\beta_1$ and $\beta_2$ may be absolutely inversely proportional to the estimated channel gain h. The AN cancelling being based on the absolute channel inversion may lead to either very large (e.g., unaffordable) or very small (e.g., insufficient to provide security) power levels for a pseudo-noise signal (e.g., an AN signal).

In some cases, a transmitting device may generate pseudo-noise signals that are not based on absolute channel inversion (e.g., a power level of the pseudo-noise signal is not solely inversely proportional to an estimated power level of the channel). For example, the transmitting device may transmit repetitions of the signal (e.g., the PDDCH or the PUCCH signal) over a single coherence time interval via different frequency resources or different beam configurations. That is, for frequency-based CSI diversity, the transmitting device may transmit each of the repetitions of the signal during the coherence time interval via different frequency resources. Additionally, for spatial- or beam-based CSI diversity, the transmitting device may transmit each of the repetitions of the signal via different beam configurations or different TRPs. In either case, the transmitting device may generate pseudo-noise signals that are not based on absolute channel inversion, but instead have power levels that are also based on gain and phase parameters. Equation 6 illustrates an example definition of a first AN (e.g., the pseudo-noise signal $\beta_1$) applied to a first repetition of a signal $x_1$, where the pseudo-noise signal $\beta_1$ is based on a first gain parameter $\gamma_1$ and a first phase parameter $\theta_1$. Additionally, Equation 7 illustrates an example definition of a second AN (e.g., the pseudo-noise signal $\beta_2$) applied to a second repetition of a signal $x_2$, where the pseudo-noise signal $\beta_2$ is based on a second gain parameter $\gamma_2$ and a second phase parameter $\theta_2$.

$$\beta_1 = \gamma_1 \frac{e^{j\theta_1}}{|h_1|^2} u \quad (6)$$

$$\beta_2 = \gamma_2 \frac{e^{j\theta_2}}{|h_2|^2} u \quad (7)$$

For example, the transmitting device may receive, from the receiving device, a reference signal (e.g., a sounding reference signal (SRS)) associated with the coherence time interval. Then, the transmitting device may estimate, based on the reference signal, the CSI for each channel during the coherence time interval. In the example of Equations 6 and 7, $h_1$ and $h_2$ may each correspond to the estimated CSI for each respective channel (e.g., estimated based on the transmitting device receiving an SRS or portion of an SRS from the receiving device via the respective channel). Here, $h_1 \neq h_2$ due to each copy being sent using a different channel (e.g., different frequency resources, a different beam configuration, etc.). Then the transmitting device may identify a set of gain and phase parameters for a respective set of pseudo-noise signals that both cause the power levels for each of the set of pseudo-noise signals to be within a defined range (e.g., greater than a first power level associated with adequately protecting the repetition of the signal and less than a second power level that may be relatively unaffordable) and enable the receiving device to utilize an AN cancellation scheme to soft combine and decode the signal.

Equations 8 and 9 illustrate examples of the signal based on applying the pseudo-noise signal $\beta_1$ (e.g., as defined according to Equation 6) and $\beta_2$ (e.g., as defined according to Equation 7) to the signals $x_1$ and $x_2$, respectively.

$$y_1 = h_1(x_1 + \beta_1) + z_1 \qquad (8)$$

$$y_2 = h_2(x_2 + \beta_2) + z_2 \qquad (9)$$

Additionally, Equation 10 illustrates an example definition of the accumulated pseudo-noise signal (e.g., accumulated AN interference) at the receiving device in cases that the transmitting device transmits repetitions of the signal according to Equations 8 and 9.

$$\beta_1 |h_1|^2 + \beta_2 |h_2|^2 = (\gamma_1 e^{j\theta_1} + \gamma_2 e^{j\theta_2}) u \qquad (10)$$

However, to generate each of the set of gain and phase parameters, the transmitting device may rely on identifying the estimated CSI for each channel (e.g., associated with each of the set of frequency resources in a case of CSI diversity, associated with each of the set of beam configurations in a case of spatial- or beam-based CSI diversity) a priori. That is, in the example of Equations 6-9 the transmitting device may estimate $h_1$ and $h_2$ using the received SRS, and determine (e.g., compute) $\{\beta_1, \theta_1\}$ and $\{\beta_2, \theta_2\}$ prior to transmitting either of the signals $y_1$ or $y_2$. In some instances, relying on identifying the estimated CSI for each channel a priori (e.g., prior to transmitting any of the signals $y_1$ or $y_2$) may result in each repetition of the signal being transmitted within a single channel coherence time. Transmitting each repetition within the single channel coherence time may increase a likelihood that a CSI associated with the channel may not change between estimating the CSI and transmitting the corresponding signal repetition, which may enable the AN to be self-cancelling at the receiving device (e.g., the parameters for the AN may accurately reflect the CSI). That is, to increase a likelihood that the estimated CSI relied upon by the transmitting device to generate a pseudo-noise signal to apply to each repetition of the signal (e.g., copy) does not change before the transmitting device transmits the protected repetition of that signal, the transmitting device may transmit each of the repetitions of the signal within a single channel coherence time.

In this example, if the transmitting device does not estimate any of the CSIs for each channel a priori (e.g., prior to generating a pseudo-noise signal to apply to a first repetition of the signal), the transmitting device may be unable to identify any gain and phase parameters that would both cause the power levels for each of the set of pseudo-noise signals to be within the defined range and enable the receiving device to utilize the AN cancellation scheme. For example, if the repetitions of signal rely on time-based CSI diversity, each repetition of the signal may be transmitted via different coherence time intervals (e.g., to provide adequate CSI diversity), each associated with different estimated CSIs. For example, the transmitting device may estimate $h_1$, determine (e.g., compute) $\{\beta_1, \theta_1\}$, and transmit the signal $y_1$. Then (e.g., after transmitting the signal $y_1$), the transmitting device may estimate $h_2$, determine (e.g., compute) $\{\beta_2, \theta_2\}$, and transmit the signal $y_2$. Here, the transmitting device may not know an estimated CSI associated with a future repetition of the signal when generating a pseudo-noise signal to apply to a repetition of the signal transmitted via an earlier coherence time interval.

In the example of the wireless communications system 100 however, a device may generate pseudo-noise signals to apply to repetitions of a signal associated with time-based CSI diversity using gain and phase parameters that are selected without a priori knowledge of CSIs of future participating time intervals (e.g., time slots or intervals for transmitting future repetitions of the signal). For example, the device may generate a pseudo-noise signal using a gain parameter selected based on an estimated power of the channel (e.g., corresponding to the estimated CSI), and without estimating a power of the channel associated with a future repetition of the signal, to ensure that the power level of the pseudo-noise signal falls between the first power level and the second power level. Additionally, to enable an authorized receiving device to soft combine and decode the transmission, the device may generate the pseudo-noise signal using a phase parameter that is selected without the transmitting device estimating a CSI associated with the channel for a future repetition of the signal.

For example, to generate a first pseudo-noise signal applied to a first repetition of a signal, the device may use a gain parameter that causes a power level of the first pseudo-noise signal to fall between the first power level and the second power level based on an estimation of the channel at a first time. Additionally, the device may use a random phase parameter to generate the first pseudo-noise signal. Then, to generate a second pseudo-noise signal applied to a subsequent repetition of the signal, the device may use a gain parameter that causes a power level of the second pseudo-noise signal to fall between the first and second power level (e.g., based on a second estimation of the channel at a second, later time). Additionally, the device may select a second phase parameter to generate the second pseudo-noise signal that enables soft combining of the first repetition to self-cancel the AN with the subsequent repetition at the authorized receiving device based on the first gain parameter, the first phase parameter, and the second gain parameter. The device may continue selecting gain and phase parameters for generating pseudo-noise signals to apply to subsequent repetitions of the transmission such that the power levels of the pseudo-noise signals fall within the defined power level range and the authorized receiving device is able to soft combine the repetitions and decode the transmission.

Figure 2:
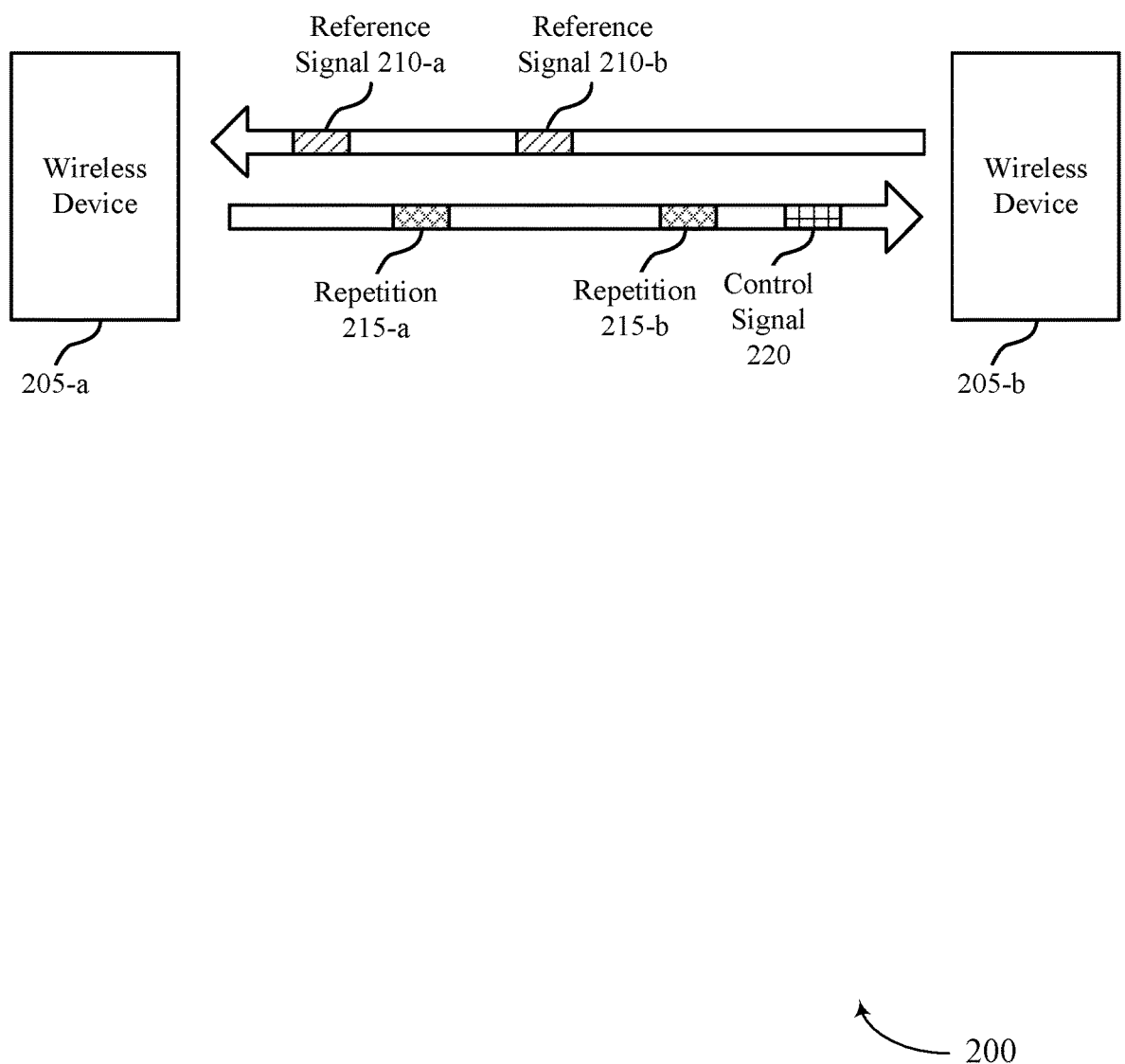

FIG. 2 illustrates an example of a wireless communications system 200 that supports power control for transmissions with time-based artificial noise in accordance with one or more aspects of the present disclosure. In some examples, wireless communications system 200 may implement aspects of wireless communications system 100 and may include wireless devices 205-*a* and 205-*b*, which may be examples of a network entity 105 or a UE 115 as described above with reference to FIG. 1. For example, the wireless device 205-*a* may be an example of a network entity 105 and the wireless device 205-*b* may be an example of a UE 115. In another example, the wireless device 205-*a* may be an example of a UE 115 and the wireless device 205-*b* may be an example of a network entity 105.

In the example of the wireless communications system 200, the wireless device 205-*a* may rely on a time-based CSI diversity scheme to transmit multiple repetitions 215 of a signal (e.g., of a PDCCH signal, of a PDSCH signal, of a PUCCH signal, of a PUSCH signal), where the signal corresponds to a packet, a message, or both. For example, the wireless device 205-*a* may transmit a first repetition 215-*a* of the signal during a first time interval and a second repetition 215-*b* of the signal during a second, non-overlapping time interval. In some cases, the first and second repetitions 215 of the signal may be separated by a minimum separation (e.g., a channel coherence time) to increase a CSI diversity between the different repetitions 215. The wireless device 205-*b* may receive the multiple repetitions 215 of the signal and soft combine the repetitions 215 of the signal to decode the signal.

In some cases, the transmitting wireless device 205-*a* may apply pseudo-noise signals to each repetition 215 prior to transmitting the repetition 215. For example, the wireless device 205-*a* may apply a first pseudo-noise signal to a first repetition 215-*a* (e.g., to generate a second signal) prior to transmitting the first repetition 215-*a* and may apply a second pseudo-noise signal to a second repetition 215-*b* (e.g., to generate a third signal) prior to transmitting the second repetition 215-*b*. The pseudo-noise signals may be based on the CSI associated with the channel between the wireless devices 205, which may enable the wireless device 205-*b* to soft combine the repetitions 215 and decode the signal, while preventing unauthorized wireless devices (not shown) from decoding the signal.

For example, the wireless device 205-*b* may transmit a reference signal 210-*a* (e.g., an SRS) to the wireless device 205-*a*. In some cases, the wireless device 205-*b* may transmit the reference signal 210-*a* in response to the wireless device 205-*a* transmitting a request for the wireless device 205-*b* to transmit the reference signal 210-*a*. The wireless device 205-*a* may estimate CSI associated with the channel corresponding to the reference signal 210-*a* and generate the first pseudo-noise signal based on the estimated CSI associated with the channel during a first time interval (e.g., during which the reference signal 210-*a* and the repetition 215-*a* are transmitted). The first pseudo-noise signal may also be based on a first gain parameter and a first phase parameter. In some cases, the wireless device 205-*a* may select the first gain parameter for the first pseudo-noise signal to cause the power level of the first pseudo-noise signal to fall within a defined range, such that the power level of the first pseudo-noise signal is greater than a first defined power level and less than a second defined power level. Additionally, the wireless device 205-*a* may select the first phase parameter randomly. After generating the first pseudo-noise signal, the wireless device 205-*a* may apply the first pseudo-noise signal to the repetition 215-*a* and may transmit the repetition 215-*a* (e.g., that is protected or secured based on applying the first pseudo-noise signal) to the wireless device 205-*b*.

The wireless device 205-*b* may transmit a second reference signal 210-*b* (e.g., an SRS) to the wireless device 205-*a*. In some cases, the wireless device 205-*b* may transmit the reference signal 210-*b* in response to the wireless device 205-*b* transmitting a request for the wireless device 205-*b* to transmit the reference signal 210-*a*. For example, the wireless device 205-*b* may transmit the request based on an amount of time between the wireless device 205-*b* transmitting the first reference signal 210-*a* and transmitting the second reference signal 210-*b* exceeding a threshold.

In another example, the wireless device 205-*b* may transmit the request based on a predicted correlation of the CSI corresponding to the reference signal 210-*a* and the CSI corresponding to the reference signal 210-*b* being less than a threshold. Here, the wireless device 205-*a* may predict CSI (e.g., statistical CSI) corresponding to the reference signal 210-*b* prior to receiving the reference signal 210-*b*. If prior to receiving the reference signal 210-*b* the wireless device 205-*a* determines that the predicted CSI (e.g., the statistical CSI) corresponding to the reference signal 210-*b* provides sufficient CSI diversity with respect to the CSI corresponding to the reference signal 210-*a*, the wireless device 205-*a* may transmit a request for the wireless device 205-*b* to transmit the reference signal 210-*b*. Additionally, if prior to receiving a reference signal 210 the wireless device 205-*a* determines that a predicted CSI corresponding to the reference signal 210 fails to provide sufficient CSI diversity with respect to the CSI corresponding to a previously-received reference signal 210, the wireless device 205-*a* may refrain from transmitting the request for the wireless device 205-*b* to transmit the reference signal 210. In these examples, the wireless device 205-*b* may not transmit a reference signal 210 unless the wireless device 205-*a* predicts that the CSI corresponding to the reference signal 210 provides sufficient CSI diversity (e.g., the wireless device 205-*a* predicts that a correlation between the CSI corresponding to a future reference signal 210 and the CSI corresponding to a previously-received reference signal 210 is less than a threshold correlation).

The wireless device 205-*a* may estimate CSI associated with the channel during a second time interval (e.g., during which the reference signal 210-*b* and the repetition 215-*b* are transmitted) corresponding to the reference signal 210-*b*. In cases that a correlation of the CSI associated with the channel during the second time interval is below a threshold (e.g., there is sufficient CSI diversity between the first and second time intervals), the wireless device 205-*a* may generate the second pseudo-noise signal based on the estimated CSI associated with the channel during the second time interval. The second pseudo-noise signal may also be based on a second gain parameter and a second phase parameter. The wireless device 205-*a* may select the second gain parameter for the second pseudo-noise signal to cause the power level of the second pseudo-noise signal to be within the defined range. The second gain and phase parameters may also be selected based on the first gain and phase parameters. That is, the wireless device 205-*a* may select values for the second gain and phase parameters to ensure that the wireless device 205-*b* may utilize a pseudo-noise signal cancellation scheme to soft combine the repetitions 215-*b* and decode the signal. After generating the second pseudo-noise signal, the wireless device may apply the second pseudo-noise signal to the repetition 215-*b* and may transmit the repetition 215-*b* (e.g., that is protected or secured based on applying the second pseudo-noise signal) to the wireless device 205-*b*.

In other cases where a correlation of the CSI associated with the channel during the first time interval and the CSI associated with the channel during the second time interval is not below the threshold (e.g., there is not sufficient CSI diversity between the first and second time intervals), the wireless device 205-*a* may not transmit the reference signal 210-*b* within the second time interval according to a time-based CSI diversity scheme. Additionally, if the repetitions 215 of the signal are associated with a defined latency bound (e.g., corresponding to a defined length of time within which the repetitions 215 of the signal are transmitted), the wireless device 205-*a* may be unable to satisfy the defined latency bound (e.g., the given latency bound requirement for the signal) using the time-based CSI diversity scheme. That is, if the channel coherence time is long (e.g., the CSI corresponding to the channel between the wireless devices 205 does not change quickly), the wireless device 205-a may be unable to transmit the repetitions 215 within the defined latency bound.

The wireless device 205-a may determine the inability of the wireless device 205-a to transmit the repetitions 215 within the defined latency bound using the time-based CSI diversity in response to receiving the reference signal 210-b. For example, the wireless device 205-a may identify that the correlation of the CSI corresponding to the received reference signal 210-a and the CSI corresponding to the received reference signal 210-b is not below the threshold. Additionally, or alternatively, the wireless device may determine the inability of the wireless device 205-a to transmit the repetitions 215 within the defined latency bound using the time-based CSI diversity in response to predicting one or more CSIs corresponding to the channel (e.g., prior to receiving one or both of the reference signals 210). For example, the wireless device may identify that a predicted CSI corresponding to the reference signal 210-b and the CSI corresponding to the predicted or received reference signal 210-a is not below the threshold.

In some examples, if the wireless device 205-a identifies that a defined latency bound associated with the repetitions 215 of the signal is not likely to be met using a time-based CSI diversity scheme, the wireless device 205-a may instead switch to another type of CSI diversity. For example, the wireless device 205-a may rely on other types of CSI diversity (e.g., frequency-based CSI diversity, spatial- or beam-based CSI diversity) to transmit the repetition 215-b. In some other examples, the wireless device 205-a may instead drop the signal (e.g., may refrain from transmitting one or more additional repetitions 215 of the signal).

The wireless device 205-a may transmit, to the wireless device 205-b, a control signal 220 (e.g., via downlink control information (DCI) including an indication that the repetitions 215-a and 215-b correspond to repetitions 215 of the single signal. For example, the control signal 220 may include an indication for the wireless device 205-b to soft combine the repetitions 215-a and 215-b to obtain the signal. Additionally, or alternatively, the control signal 220 may include an indication of one or more time intervals (e.g., time slots) that include the repetitions 215 for the wireless device 205-b to soft combine.

In cases that the wireless device 205-b fails to detect one or more of the repetitions 215 (e.g., indicated within the control signal 220), the wireless device 205-b may transmit feedback to the wireless device 205-a. For example, the wireless device 205-b may transmit a negative acknowledgement (NACK) indication to the wireless device 205-a indicating the failure of the wireless device 205-b to detect one or more of the repetitions 215. If the wireless device 205-a receives, from the wireless device 205-b, feedback indicating that the wireless device 205-b failed to detect one or more of the repetitions 215, the wireless device 205-a may retransmit one or more of the repetitions 215. For example, the wireless device 205-a may retransmit the one or more repetitions 215 that the wireless device 205-b indicated (e.g., via a NACK) the failure to detect. In another example, the wireless device 205-a may retransmit each of the repetitions 215 of the signal. Additionally, or alternatively, if the wireless device 205-a receives feedback from the wireless device 205-b indicating a failure to detect one or more of the repetitions 215, the wireless device 205-a may drop the message and not retransmit any of the repetitions 215. Here, the wireless device 205-b may be unable to decode the message.

Figure 3:
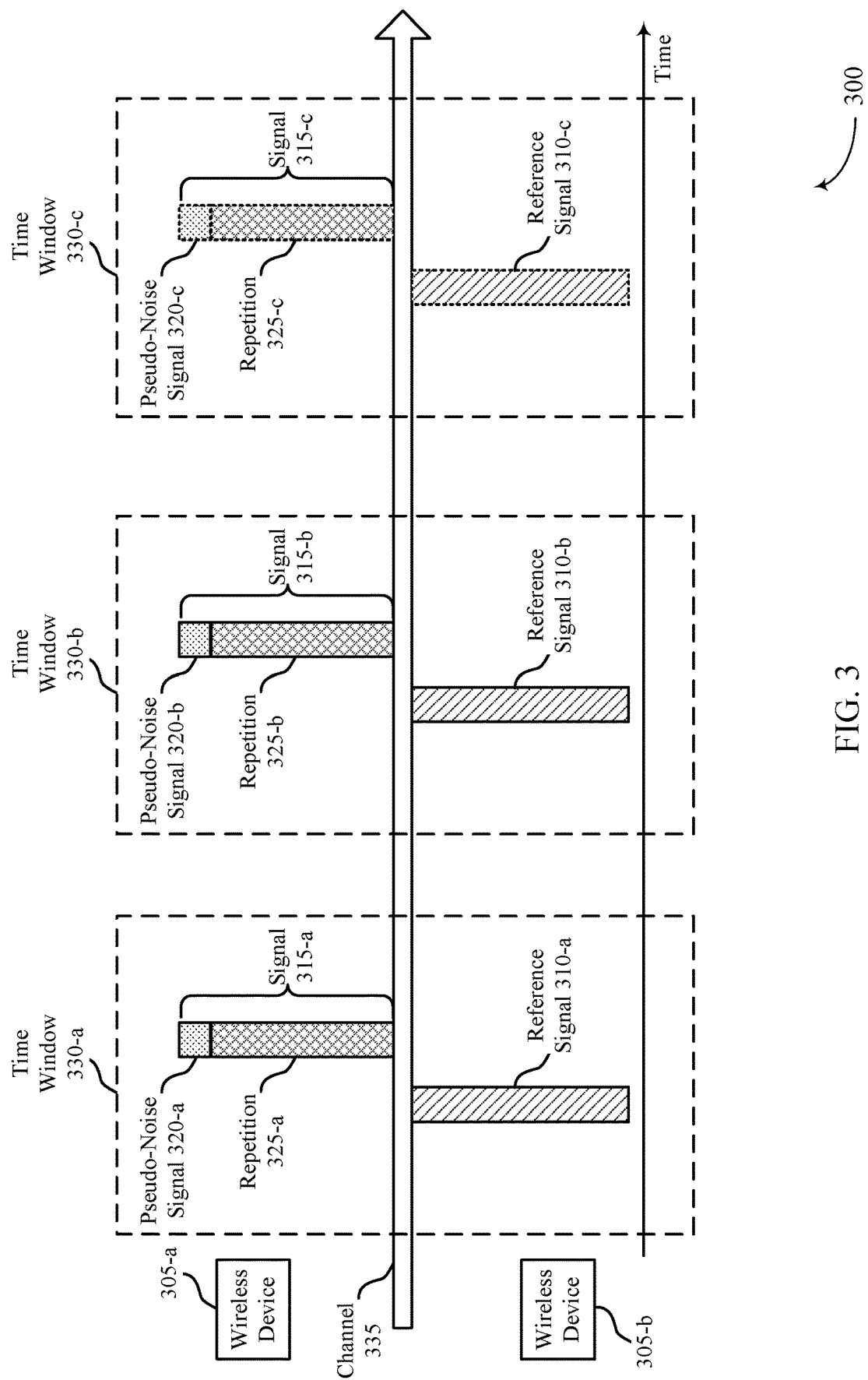
FIG. 3 illustrates timing diagram that supports power control for transmissions with time-based artificial noise in accordance with one or more aspects of the present disclosure.

FIG. 3 illustrates an example of a timing diagram 300 that supports power control for transmissions with time-based artificial noise in accordance with one or more aspects of the present disclosure. In some examples, the timing diagram 300 may implement or be implemented by aspects of wireless communications system 100 and wireless communications system 200 and may include the wireless devices 205, which may be examples of the UEs 115, the network entities 105, and the wireless devices 205 as described above with reference to FIGS. 1 and 2. In one example, the wireless device 305-a may include a network entity 105 and the wireless device 305-b may include a UE 115. In another example, the wireless device 305-a may include a UE 115 and the wireless device 305-b may include a network entity 105.

The timing diagram 300 may illustrate communications between the wireless devices 305 associated with a time-based CSI diversity scheme as described herein. The wireless device 305-a may rely on a time-based CSI diversity scheme to transmit the repetitions 325 of a signal (e.g., of a PDCCH signal, of a PDSCH signal, of a PUCCH signal, of a PUSCH signal) via different time windows 330 (e.g., different time slots, different channel coherence time windows). For example, the wireless device 305-a may transmit a first repetition 325-a of the signal via a first time window 330-a, a second repetition 325-b of the signal via a second time window 330-b, and may optionally transmit a third repetition 325-c of the signal via a third time window 330-c. To achieve the time-based CSI diversity, there may be a sufficient CSI diversity between each of the time windows 330. For example, the wireless device 305-a may determine there is sufficient CSI diversity in cases that a correlation between estimated CSIs associated with each of the time windows 330 is less than a threshold. In some cases, if the wireless device 305-a determines that there is insufficient CSI diversity (e.g., if the correlation between estimated CSIs associated with each of the time windows 330 is greater than the threshold), the wireless device 305-a may discard the current slot (e.g., without sending a repetition 325 within the slot). Additionally, or alternatively, the wireless device 305-a may determine that the current time window 330 corresponds to an initial time window 330 (and therefore is independent of any CSI diversity or correlation associated with a previous time window 330). Here, the wireless device 305-a may transmit future copies of the repetition 325 in future time windows 330.

The wireless device 305-a may estimate a CSI corresponding to each time window 330 using a reference signal 310 (e.g., an SRS) transmitted by the wireless device 305-b to the wireless device 305-a via the channel 335. In some cases, the wireless device 305-b may transmit each reference signal 310 (e.g., reference signal 310-a, reference signal 310-b, reference signal 310-c) in response to the wireless device 305-a transmitting, to the wireless device 305-b, an indication for the wireless device 305-b to transmit the reference signal 310. The wireless device 305-a may generate a pseudo-noise signal 320 (e.g., to apply to a repetition 325 of the signal) based on the estimated CSI. Equation 10 includes an example equation that the wireless device 305-a may use to generate a pseudo-noise signal 320.

$$\beta_n = \gamma_n \frac{e^{j\theta_n}}{|h_n|^2} u \qquad (10)$$

In the example of Equation 10, $\beta_n$ may correspond to the pseudo-noise signal 320 applied to a $n^{th}$ repetition 325 of the signal, $h_n$ may correspond to the estimated CSI of the channel 335 associated with the $n^{th}$ time window 330, u may correspond to a noise vector, $\gamma_n$ corresponds to a gain parameter, and $\theta_n$ corresponds to a phase parameter. The wireless device 305-a may select the gain parameter $\gamma_n$ to generate the pseudo-noise signal 320 that causes a power of the signal $\beta_n$ (e.g., corresponding to the pseudo-noise signal 320) to be within a defined range. An example definition of the defined power level range of the pseudo-noise signal 320 (e.g., corresponding to $\beta_n$) is shown below with reference to Equation 11.

$$|\beta_{min}| \leq |\beta_n| \leq |\beta_{max}| \quad (11)$$

The defined range (e.g., including $\beta_{min}$ and $\beta_{max}$) may be set by a network entity based on security requirements, a power budget (e.g., of one or both of the wireless devices 305), or both. In the example of the initial time window 330-a, the wireless device 305-a may randomly select the gain parameter $\gamma_1$ from a set of possible values for the gain parameter $\gamma_1$ that would ensure that the power level of the signal $\beta_1$ falls within the predefined range (e.g., the range outlined according to Equation 11). In the example of subsequent time windows 330 (e.g., time windows 330 in which repetitions 325 other than the initial repetition 325-a are transmitted), the wireless device 305-a may select a gain parameter $\gamma_n$ that both causes the power level of the corresponding signal to fall within the defined range and enables the wireless device 305-b to perform a pseudo-noise signal cancellation scheme, which may be based on the values of both the gain parameter(s) $\gamma_n$ and phase parameter(s) $\theta_n$ applied to the earlier-transmitted repetitions 325 of the signal. In some examples, the wireless device 305-a may select a gain parameter $\gamma_n$ according to Equation 12.

$$|\beta_{min}| \leq |\beta_n(\gamma_n)| = \frac{\gamma_n}{|h_n|^2}|u| \leq |\beta_{max}| \quad (12)$$

Additionally, in the example of the initial time window 330-a, the wireless device 305-a may randomly select the phase parameter $\theta_1$. In the example of subsequent time windows 330 (e.g., time windows 330 in which repetitions 325 other than the initial repetition 325-a are transmitted), the wireless device 305-a may select a phase parameter $\theta_n$ that enables the wireless device 305-b to perform a pseudo-noise signal cancellation scheme and may be based on the values of the both the gain parameter(s) $\gamma_n$ and phase parameter(s) $\theta_n$ applied to the earlier-transmitted repetitions 325 of the signal.

The wireless device 305-a may apply the pseudo-noise signal 320 to a repetition 325 of the signal to generate a signal 315 (e.g., signal 315-a, signal 315-b, signal 315-c) to transmit to the wireless device 305-b. An example definition of the signal 315 (e.g., $y_n$) generated by the wireless device 305-a based on applying the pseudo-noise signal 320 (e.g., $\beta_n$) to the repetition 325 (e.g., $x_n$) is illustrated by Equation 13.

$$y_n = h_n(x_n + \beta_n) + z_n \quad (13)$$

As described above, $z_n$ may correspond to observation noise, and $h_n$ may correspond to the estimated CSI of the channel 335 associated with the $n^{th}$ time window 330.

The wireless device 305-b may receive each of signals 315 (e.g., each of the AN-impaired messages) that include a repetition 325 that is protected via a pseudo-noise signal 320 (e.g., pseudo-noise signal 320-a, pseudo-noise signal 320-b, pseudo-noise signal 320-c). The wireless device 305-b may not decode each signal 315 individually, but instead may buffer each of the received signals 315. Equation 14 includes an example definition of the total buffered pseudo-noise signals 320 (e.g., an accumulated AN interference) at the wireless device 305-b in cases that the wireless device 305-b receives and buffers j total repetitions 325 of a message.

$$\beta_1|h_1|^2 + \beta_2|h_2|^2 + \ldots + \beta_j|h_j|^2 = (\gamma_1 e^{j\theta_1} + \gamma_2 e^{j\theta_2} + \ldots + \gamma_j e^{j\theta_j})u \quad (14)$$

When the wireless device 305-b receives an indication from the wireless device 305-a of each of the signals 315 that include repetitions 325 of the message, the wireless device 305-b may soft combine each of the signals 315 according to a pseudo-noise cancellation scheme. For example, the wireless device 305-a may have selected values of $\gamma_1, \gamma_2, \ldots, \gamma_j$ and $\theta_1, \theta_2, \ldots, \theta_j$ such that $(\gamma_1 e^{j\theta_1} + \gamma_2 e^{j\theta_2} + \ldots + \gamma_j e^{j\theta_j})$ u=0. Then, the wireless device 305-b may combine each of the repetitions 325 (e.g., repetition 325-a, repetition 325-b, repetition 325-c) and attempt to decode the message included in each of the repetitions 325.

Figure 4:
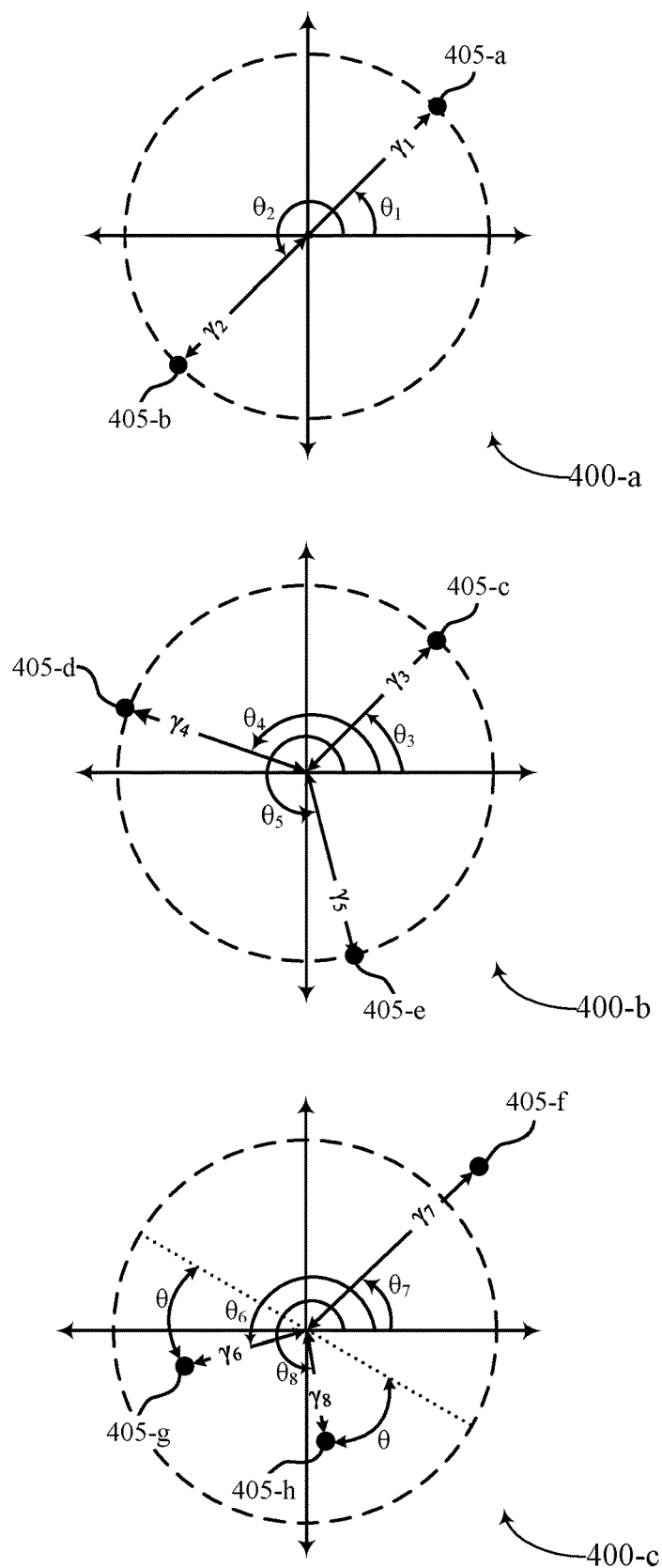
FIG. 4 illustrates examples of pseudo-noise signal parameter configurations that support power control for transmissions with time-based artificial noise in accordance with one or more aspects of the present disclosure.

FIG. 4 illustrates examples of pseudo-noise signal parameter configurations 400 that support power control for transmissions with time-based artificial noise in accordance with one or more aspects of the present disclosure. The pseudo-noise signal parameter configurations 400 may be implemented by aspects of the wireless communications systems 100 and 200 or the timing diagram 300. For example, any of the wireless devices as described with reference to FIGS. 1 through 3 may implement aspects of the pseudo-noise signal parameter configurations 400 to transmit repetitions of a signal according to a time-based CSI diversity scheme, where each of the repetitions of the signal are protected using a pseudo-noise signal as described herein. In some cases, a wireless device may select parameters for the pseudo-noise signals applied to the repetitions of the signal in accordance with one of the pseudo-noise signal parameter configurations 400.

Each of the pseudo-noise signal parameter configurations 400 may illustrate sets of points 405 that are each associated with a gain parameter $\gamma$ and a phase parameter $\theta$. Each point 405 may be defined based on the corresponding gain parameter $\gamma$ and phase parameter $\theta$. For example, each point 405 may be mapped to the axes according to Equation 15.

$$\gamma e^{j\theta} u \quad (15)$$

In some cases, a wireless device may generate corresponding pseudo-noise signals based on the corresponding points 405 as described with reference to Equation 10. For example, if a wireless device relies on the pseudo-noise signal parameter configuration 400-a, the wireless device may generate a first pseudo-noise signal (e.g., according to Equation 10) using the gain parameter $\gamma_1$ and the phase parameter $\theta_1$ to apply to a first repetition of a signal. Additionally, the wireless device may generate a second pseudo-noise signal (e.g., according to Equation 10) using the gain parameter $\gamma_2$ and the phase parameter $\theta_2$ to apply to a second repetition of the signal.

In another example, if the wireless device relies on the pseudo-noise signal parameter configuration 400-b, the wireless device may generate three pseudo-noise signals to apply to each of three corresponding repetitions of the signal: a first pseudo-noise signal generated using the gain parameter $\gamma_3$ and the phase parameter $\theta_3$, a second pseudo-noise signal generated using the gain parameter $\gamma_4$ and the phase parameter $\theta_4$, and a third pseudo-noise signal generated using the gain parameter $\gamma_4$ and the phase parameter $\theta_4$. Further, if the wireless device relies on the pseudo-noise signal parameter configuration 400-c, the wireless device may generate three pseudo-noise signals to apply to each of three corresponding repetitions of the signal: a first pseudo-noise signal generated using the gain parameter $\gamma_6$ and the phase parameter $\theta_6$, a second pseudo-noise signal generated using the gain parameter $\gamma_7$ and the phase parameter $\theta_7$, and a third pseudo-noise signal generated using the gain parameter $\gamma_8$ and the phase parameter $\theta_8$.

Each of the pseudo-noise signal parameter configurations 400 correspond to example clusters of points 405 that are associated with gain parameters and phase parameters that cause a summation of each of the points 405 to equal 0 (e.g., at the receiving device). This may enable a receiving wireless device to combine the set of pseudo-noise signals generated according to any of the pseudo-noise signal parameter configurations 400 to cancel out the accumulated pseudo-noise signal. Thus, the pseudo-noise signal parameter configurations 400 include example pseudo-noise signal parameter configurations 400 that enable a receiving wireless device to perform a pseudo-noise cancellation scheme (e.g., an AN cancellation scheme).

In the example of pseudo-noise signal parameter configuration 400-a, the gain parameters $\gamma_1$ and $\gamma_2$ and the phase parameters $\theta_1$ and $\theta_2$ may be defined according to Equations 16 and 17.

$$\gamma_1 = \gamma_2 \tag{16}$$

$$\theta_2 = \theta_1 + \pi \tag{17}$$

Defining the gain parameters $\gamma_1$ and $\gamma_2$ and the phase parameters $\theta_1$ and $\theta_2$ according to Equations 16 and 17, respectively, may cause $\gamma_1 e^{j\theta_1} + \gamma_2 e^{j\theta_2} = 0$. In some cases, a transmitting wireless device may generate pseudo-noise signals corresponding to the cluster of points 405-a and 405-b in cases that the two time slots (e.g., for transmitting the first and second repetitions of the signal) have a similar channel strength. That is, in cases that the two time slots do not have similar channel strengths (e.g., if the estimated CSIs associated with the two time slots are not within a threshold), a transmitting device may be unable to generate pseudo-noise signals according to the pseudo-noise signal parameter configuration 400-a.

Additionally, in the example of the pseudo-noise signal parameter configuration 400-b, the values of the gain parameters $\gamma_3$, $\gamma_4$, and $\gamma_5$ and the phase parameters $\theta_3$, $\theta_4$, and $\theta_5$ may be defined according to Equations 18, 19, and 20.

$$\gamma_3 = \gamma_4 = \gamma_5 \tag{18}$$

$$\theta_4 = \theta_3 + 2\pi/3 \tag{19}$$

$$\theta_5 = \theta_3 + 4\pi/3 \tag{20}$$

Defining the gain parameters $\gamma_3$, $\gamma_4$, and $\gamma_5$ and the phase parameters $\theta_3$, $\theta_4$, and $\theta_5$ according to Equations 18, 19, and 20 may cause $\gamma_3 e^{j\theta_3} + \gamma_4 e^{j\theta_4} + \gamma_5 e^{j\theta_5} = 0$. In some cases, a transmitting wireless device may generate pseudo-noise signals corresponding to the cluster of points 405-c, 405-d, and 405-e in cases that the three time slots (e.g., for transmitting the first and second repetitions of the signal) have a similar channel strength. The pseudo-noise signal parameter configuration 400-b may provide additional security protection as compared to the pseudo-noise signal parameter configuration 400-a due to having three repetitions of the signal rather than two repetitions of the signal. However, channel conditions may inhibit a transmitting wireless device from implementing the pseudo-noise signal parameter configuration, as the channel may be less likely to have three slots with similar channel strength (but sufficient CSI diversity) than having two slots with similar channel strength (but sufficient CSI diversity). Additionally, a transmitting wireless device may be unable to generate pseudo-noise signals according to the pseudo-noise signal parameter configuration 400-b in cases that the three time slots do not have similar channel strength.

Further, in the example of the pseudo-noise signal parameter configuration 400-c, the values of the gain parameters $\gamma_6$, $\gamma_7$, and $\gamma_8$ and the phase parameters $\theta_6$, $\theta_7$, and $\theta_8$ may be defined according to Equations 21, 22, 23, and 24.

$$\gamma_7 = 2\sin(\theta)\gamma_6, \ (\gamma_7 \leq 2\gamma_6) \tag{21}$$

$$\gamma_8 = \gamma_6 \tag{22}$$

$$\theta_6 = \theta_7 + \left(\theta + \frac{\pi}{2}\right) \tag{23}$$

$$\theta_8 = \theta_7 - \left(\theta + \frac{\pi}{2}\right) \tag{24}$$

Defining the gain parameters $\gamma_6$, $\gamma_7$, and $\gamma_8$ and the phase parameters $\theta_6$, $\theta_7$, and $\theta_8$ may cause $\gamma_6 e^{j\theta_6} + \gamma_7 e^{j\theta_7} + \gamma_8 e^{j\theta_8} = 0$. In some cases, a transmitting wireless device may generate pseudo-noise signals corresponding to the cluster of points 405-f, 405-g, and 405-h in cases that a phase different of the time slots is $$\gamma_7 = 2\sin(\theta)\gamma_6, \ (\gamma_7 \leq 2\gamma_6) \tag{21}$$

$$\gamma_8 = \gamma_6 \tag{22}$$

$$\theta_6 = \theta_7 + \left(\theta + \frac{\pi}{2}\right) \tag{23}$$

$$\theta_8 = \theta_7 - \left(\theta + \frac{\pi}{2}\right) \tag{24}$$

and a ratio of the gain parameters is $2\sin(\theta)$. Further, the transmitting device may use the pseudo-noise signal parameter configuration 400-a (e.g., instead of the pseudo-noise signal parameter configuration 400-c) if a channel strength of the third slot is similar to any of the previous time slots.

Figure 5:
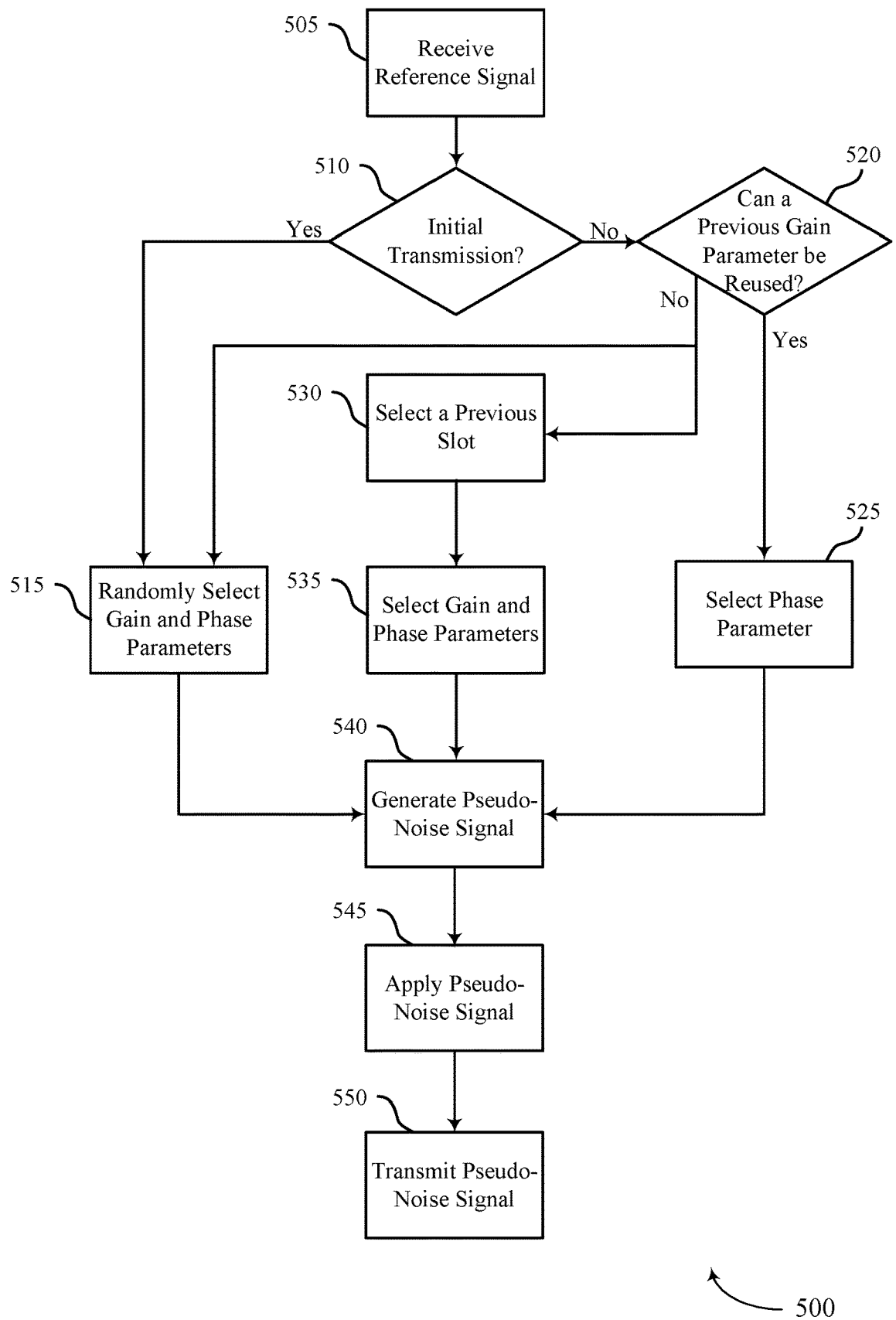
FIG. 5 illustrates an example of a flowchart that supports power control for transmissions with time-based artificial noise in accordance with one or more aspects of the present disclosure.

FIG. 5 illustrates an example of a flow chart 500 that supports power control for transmissions with time-based artificial noise in accordance with one or more aspects of the present disclosure. The flow chart 500 may implement or be implemented by aspects of wireless communications systems 100 and 200, timing diagram 300, and pseudo-noise signal parameter configurations 400. For example, any of the wireless devices as described with reference to FIGS. 1 through 3 may implement the flow chart 500 according to one of the pseudo-noise signal parameter configurations as described with reference to FIG. 4.

In some cases, a wireless device may execute the flow chart 500 to generate a pseudo-noise signal to apply to a repetition of a signal transmitted according to a time-based CSI diversity scheme.

At 505, a first wireless device may receive, from a second wireless device, a reference signal. For example, the first wireless device may receive an SRS from the second wireless device. Then, the first wireless device may estimate a CSI for an $n^{th}$ slot associated with a channel between the first and second wireless device using the received reference signal. In some cases, the estimated CSI for the $n^{th}$ slot (e.g., that is included in a first channel coherence time window) may correspond to $h_n$.

At 510, the first wireless device may determine whether the repetition of the signal is an initial repetition. For example, if another repetition of the signal has been transmitted in a previous slot (e.g., an m'h slot included in a previous channel coherence time window), the first wireless device may determine that the current repetition is not the initial transmission and may proceed to 520. Additionally, or alternatively, if another repetition of the signal has not been transmitted in a previous slot, the first wireless device may determine that the current repetition is the initial transmission and may proceed to 515.

At 515, the first wireless device may randomly select a gain parameter $\gamma_n$ that causes a power level of the associated pseudo-noise signal to fall within a predefined range (e.g., as described with reference to Equations 11 and 12). Additionally, the first wireless device may randomly select a phase parameter for the initial repetition $\theta_n$. Based on randomly choosing the gain parameter $\gamma_n$ and the phase parameter $\theta_n$ for the initial repetition, the first wireless device may proceed to 540.

At 520, the first wireless device may determine whether a gain parameter $\gamma_m$ used to generate a pseudo-noise signal applied to a previous repetition in a previous slot (e.g., an $m^{th}$ slot included in a previous channel coherence time window) can be reused. For example, the first wireless device may determine whether using the gain parameter $\gamma_m$ to generate a pseudo-noise signal based on the CSI estimated at 505 would generate a pseudo-noise signal having a power level within the defined range (e.g., as described with reference to Equations 11 and 12). In cases that the gain parameter $\gamma_m$ may be reused, the first wireless device may set the gain parameter $\gamma_n$ to be equal to the gain parameter $\gamma_m$ and proceed to 525. In cases that the gain parameter $\gamma_m$ may not be reused, the first wireless device may proceed instead to either 515 or to 530.

At 525, the first wireless device may select a phase parameter $\theta_n$ based on the setting the gain parameter $\gamma_n$ to be equal to the gain parameter $\gamma_m$. In one example where the first wireless device selects a phase parameter according to the pseudo-noise signal parameter configuration 400-a, the first wireless device may set the phase parameter $\theta_n$ to be equal to $\theta_m+\pi$, as described with reference to Equations 16 and 17. In another example where the first wireless device selects a phase parameter according to the pseudo-noise signal parameter configuration 400-b, the first wireless device may set the phase parameter $\theta_n$ to be equal to $$\theta_m + \frac{2\pi}{3} \text{ or } \theta_m + \frac{4\pi}{3}$$

(e.g., as described with reference to Equations 18 through 20). For example, in cases that the current repetition corresponds to a third repetition and there is an additional $k^{th}$ previous slot (e.g., within a second previous channel coherence time window) with a gain parameter $\gamma_k$ such that $$\gamma_k = \gamma_m = \gamma_n \text{ and } \theta_k = \theta_n + \frac{2\pi}{3},$$

the first wireless device may set $\theta_n$ to be equal to $$\theta_m + \frac{4\pi}{3}.$$

Additionally, if the current repetition corresponds to a second repetition and there is not an additional $k^{th}$ previous slot (e.g., within a second previous channel coherence time window) with a gain parameter $\gamma_k$ such that $\gamma_k=\gamma_m=\gamma_n$ and $$\theta_k = \theta_n + \frac{2\pi}{3},$$

the first wireless device may set the phase parameter $\theta_n$ to be equal to $$\theta_m + \frac{2\pi}{3}.$$

In another example, the first wireless device may select a phase parameter according to the pseudo-noise signal parameter configuration 400-c. Here, the first wireless device may first determine that the current repetition corresponds to a third repetition and there is an additional $k^{th}$ previous slot (e.g., within a second previous channel coherence time window) with a gain parameter $\gamma_k$ such that $\gamma_k=2 \sin(\theta)\gamma_m=2 \sin(\theta)\gamma_n$ (e.g., as described with reference to Equation 21). Then, the first wireless device may set the phase parameter $\theta_n$ to be equal to $$\theta_k - \theta - \frac{\pi}{2},$$

where $\theta=\sin^{-1}(\gamma_k/2\gamma_n)$ (e.g., as described with reference to Equations 23 and 24). After selecting the phase parameter at 525, the device may proceed to 540.

At 530, the first wireless device may select a previous slot within which a previous repetition of the signal has been transmitted. For example, the first wireless device may select (e.g., arbitrarily) a previous slot m included in a previous channel coherence time window, where the pseudo-noise signal transmitted via the previous slot m was generated using a gain parameter $\gamma_m$ and a phase parameter $\theta_m$. Then the first wireless device may proceed to 535.

At 535, the first wireless device may select a gain parameter $\gamma_n$ and a phase parameter $\theta_n$ for generating the current pseudo-noise signal. For example, the first wireless device may select the gain parameter $\gamma_n$ and a phase parameter $\theta_n$ according to the pseudo-noise signal parameter configuration 400-c. In a first example where generating a pseudo-noise signal using a gain parameter $\gamma_n \geq \gamma_m/2$ causes a power level of the pseudo-noise signal to be within the defined range (e.g., as defined according to Equations 11 and 12), the first wireless device may set the gain parameter $\gamma_n=\gamma_m/(2 \sin \theta)$. Additionally, the first wireless device may set the $\theta_m=\theta_n+\theta+\pi/2$, where $\theta=\sin^{-1}(\gamma_n/2\gamma_m)$. In some cases, the gain parameter $\gamma_n \geq \gamma_m/2$ may cause the power level of the pseudo-noise signal to be within the defined range in cases that the power level of the pseudo-noise signal transmitted via the current slot n is less than a power level of the pseudo-noise signal transmitted via the previous slot m.

In another example where generating a pseudo-noise signal using a gain parameter $\gamma_n < \gamma_m/2$ causes a power level of the pseudo-noise signal to be within the defined range (e.g., as defined according to Equations 11 and 12), the first wireless device may set the gain parameter $\gamma_n=(2 \sin \theta)\gamma_m$. Additionally, the first wireless device may set the $\theta_m=\theta_n+\theta+\pi/2$, where $\theta=\sin^{-1}(\gamma_m/2\gamma_n)$. In some cases, the gain parameter $\gamma_n<\gamma_m/2$ may cause the power level of the pseudo-noise signal to be within the defined range in cases that the power level of the pseudo-noise signal transmitted via the current slot n is greater than a power level of the pseudo-noise signal transmitted via the previous slot m.

Thus, gain and phase parameters for a future repetition of the signal may be selected according to the pseudo-noise signal parameter configuration 400-c (e.g., to select gain and phase parameters for a third repetition) or according to the pseudo-noise signal parameter configuration 400-a (e.g., to select gain and phase parameters for a second repetition). After selecting the gain and phase parameters at 535, the first wireless device may proceed to 540.

At 540, the first wireless device may generate a pseudo-noise signal (e.g., as described with reference to Equation 10) using the selected gain and phase parameters. At 545, the first wireless device may apply the pseudo-noise signal to a repetition of the signal (e.g., message, packet) to generate a signal for transmitting to the second wireless device. Then, the first wireless device may transmit the signal to the second wireless device at 550.

Figure 6:
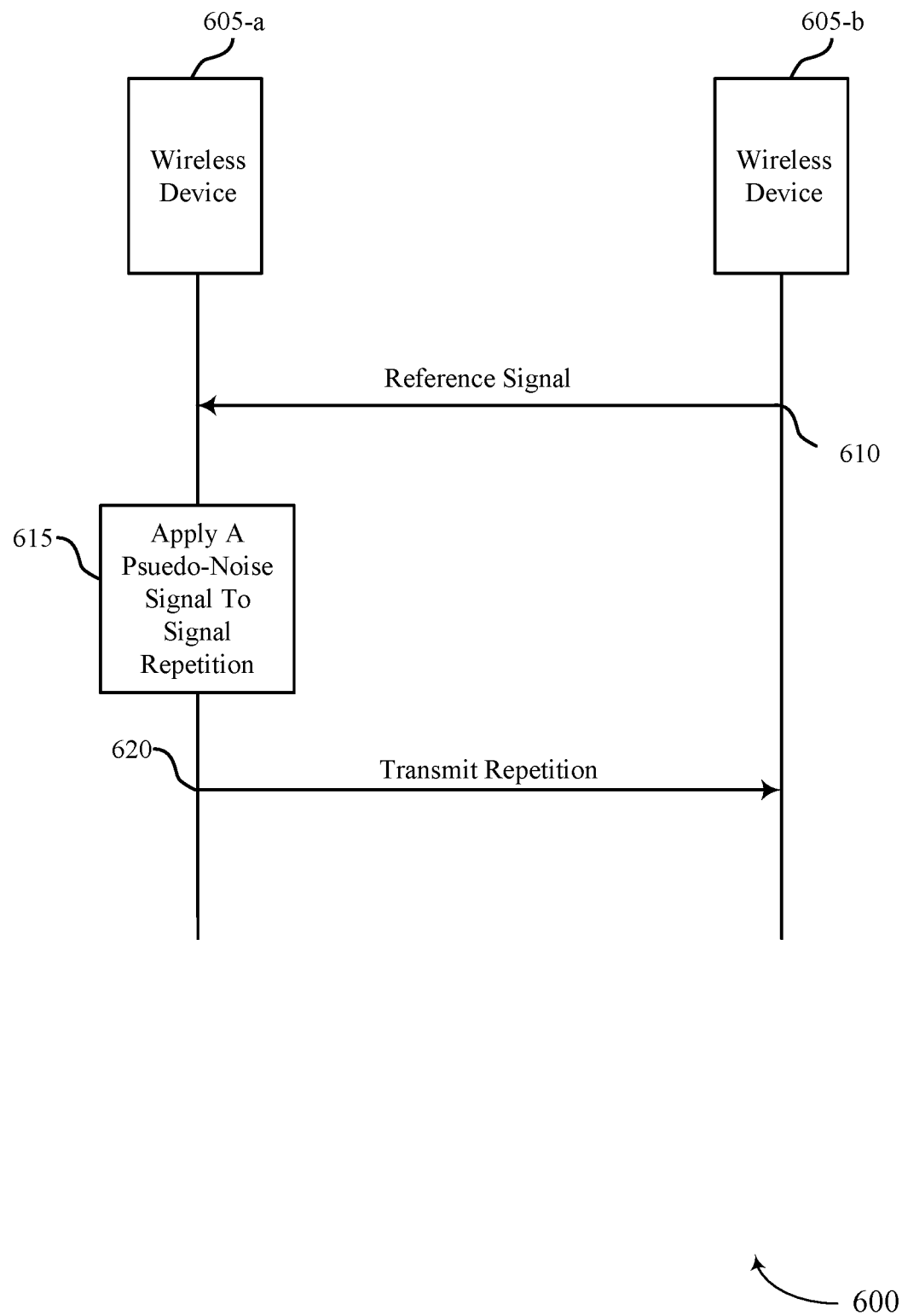
FIG. 6 illustrates an example of a process flow that supports power control for transmissions with time-based artificial noise in accordance with one or more aspects of the present disclosure.

FIG. 6 illustrates an example of a process flow 600 that supports power control for transmissions with time-based artificial noise in accordance with one or more aspects of the present disclosure. In some examples, process flow 600 may implement or be implemented by aspects of the wireless communications system 100, the wireless communications system 200, and the timing diagram 300. For example, the process flow 600 may include wireless devices (e.g., wireless device 605-a and wireless device 605-b) which may be examples of wireless devices (e.g., UEs 115 and network entities 105) as described with respect to FIG. 1.

At 610, the wireless device 605-a may receive a first reference signal (e.g., an SRS) from the wireless device 605-b over a first time interval.

At 615, the wireless device 605-a may apply a first pseudo-noise signal to a first repetition of a first signal to obtain a second signal, where the first pseudo-noise signal is based on a first estimated CSI corresponding to the first reference signal, a first gain parameter, and a first phase parameter. Additionally, the first gain parameter and the first phase parameter are based on a second gain parameter and a second phase parameter of a second pseudo-noise signal applied to a second repetition of the first signal to obtain a third signal that is transmitted to the wireless device 605-b over a second time interval occurring prior to the first time interval.

At 620, the wireless device may transmit the second signal to the wireless device 605-b over a third time interval occurring after the first time interval.

Figure 7:
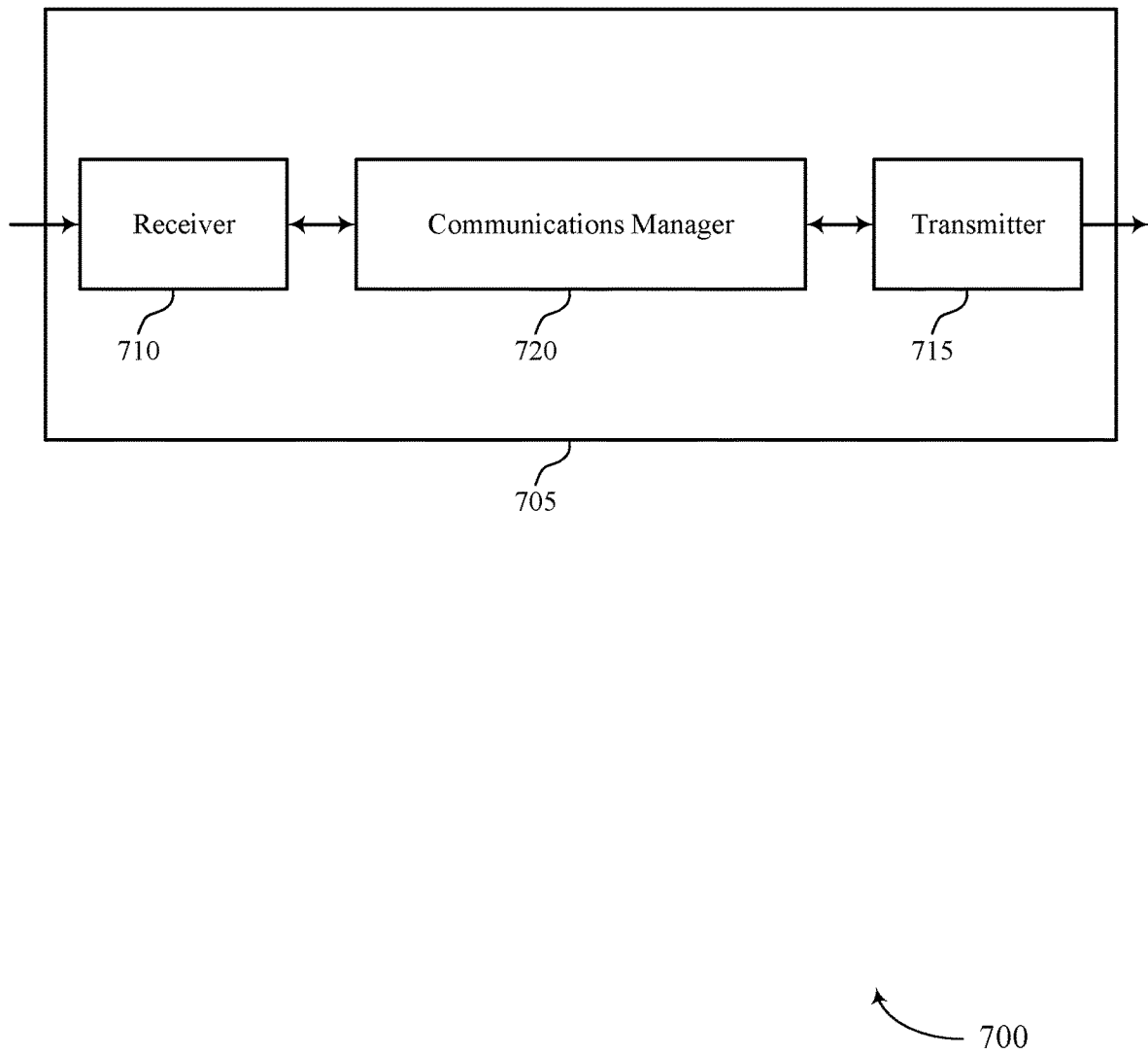
FIGS. 7 and 8 illustrate block diagrams of devices that support power control for transmissions with time-based artificial noise in accordance with one or more aspects of the present disclosure.

FIG. 7 illustrates a block diagram 700 of a device 705 that supports power control for transmissions with time-based artificial noise in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of power control for transmissions with time-based artificial noise as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a network entity in accordance with examples as disclosed herein. For example, the communications manager 720 may be configured as or otherwise support a means for receiving a first reference signal from a UE over a first time interval. The communications manager 720 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval. The communications manager 720 may be configured as or otherwise support a means for transmitting the second signal to the UE over a third time interval occurring after the first time interval.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced power consumption.

Figure 8:
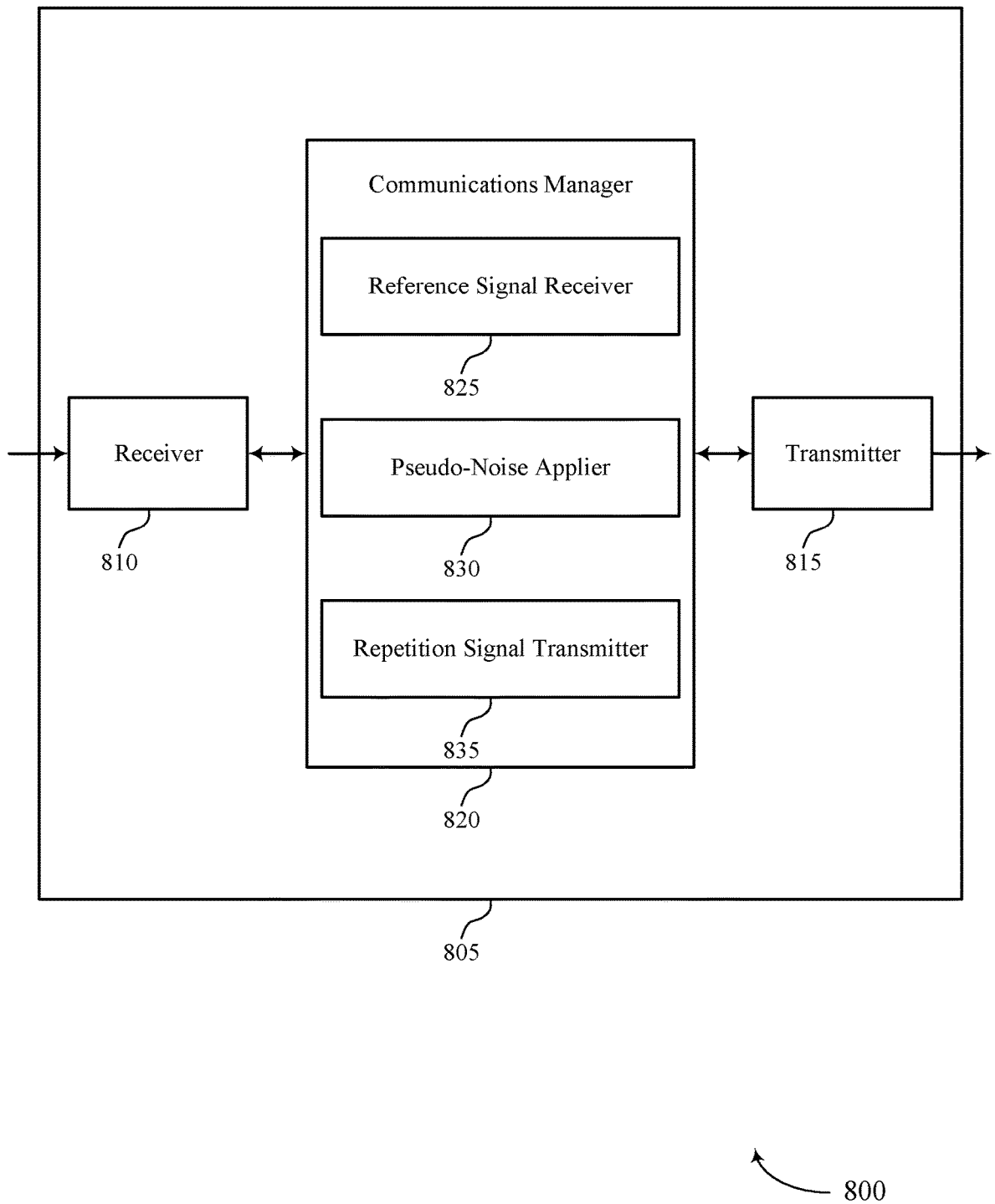

FIG. 8 illustrates a block diagram 800 of a device 805 that supports power control for transmissions with time-based artificial noise in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of power control for transmissions with time-based artificial noise as described herein. For example, the communications manager 820 may include a reference signal receiver 825, a pseudo-noise applier 830, a repetition signal transmitter 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. The reference signal receiver 825 may be configured as or otherwise support a means for receiving a first reference signal from a UE over a first time interval. The pseudo-noise applier 830 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval. The repetition signal transmitter 835 may be configured as or otherwise support a means for transmitting the second signal to the UE over a third time interval occurring after the first time interval.

Figure 9:
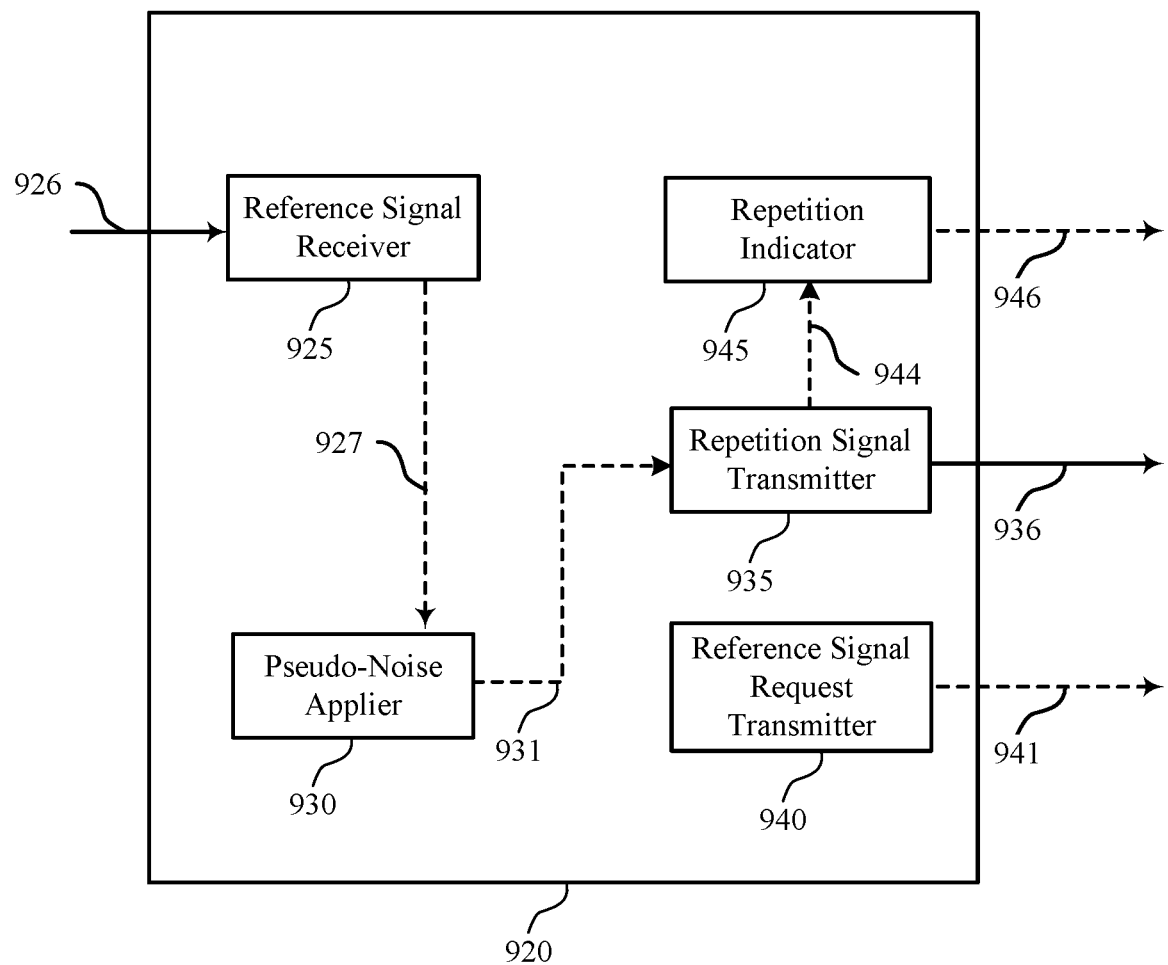
FIG. 9 illustrates a block diagram of a communications manager that supports power control for transmissions with time-based artificial noise in accordance with one or more aspects of the present disclosure.

FIG. 9 illustrates a block diagram 900 of a communications manager 920 that supports power control for transmissions with time-based artificial noise in accordance with one or more aspects of the present disclosure. The communications manager 920 may be an example of aspects of a communications manager 720, a communications manager 820, or both, as described herein. The communications manager 920, or various components thereof, may be an example of means for performing various aspects of power control for transmissions with time-based artificial noise as described herein. For example, the communications manager 920 may include a reference signal receiver 925, a pseudo-noise applier 930, a repetition signal transmitter 935, a reference signal request transmitter 940, a repetition indicator 945, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communication at a network entity in accordance with examples as disclosed herein. The reference signal receiver 925 may be configured as or otherwise support a means for receiving a first reference signal from a UE over a first time interval. For instance, the reference signal receiver 925 may obtain reference signals 926, which may include the first reference signal. The pseudo-noise applier 930 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval. In some cases, the pseudo-noise applier 930 may obtain estimated CSIs 927 from the reference signal receiver 925, which may include the first estimated CSI. In some instances, the pseudo-noise applier 930 may output signals 931 that are generated based on applying pseudo-noise signals to repetitions of the first signal, which may include the third signal, to the repetition signal transmitter 935. The repetition signal transmitter 935 may be configured as or otherwise support a means for transmitting the second signal 936 to the UE over a third time interval occurring after the first time interval.

In some examples, a first power level of the first pseudo-noise signal is based on the first gain parameter. In some examples, the first gain parameter is based on the first power level of the first pseudo-noise signal being greater than a first defined power level and less than a second defined power level.

In some examples, the first gain parameter is equal to the second gain parameter based on the first power level of the first pseudo-noise signal being greater than the first defined power level and less than the second defined power level when the first gain parameter is equal to the second gain parameter.

In some examples, the first phase parameter is further based on a third gain parameter and a third phase parameter of a third pseudo-noise signal applied to a third repetition of the first signal to obtain a fourth signal that is transmitted to the UE over a fourth time interval occurring prior to the first time interval.

In some examples, the reference signal receiver 925 may be configured as or otherwise support a means for receiving, after transmitting the second signal to the UE, a second reference signal from the UE. For instance, the reference signal receiver 925 may obtain reference signals 926, which may include the second reference signal. In some examples, the pseudo-noise applier 930 may be configured as or otherwise support a means for applying a third pseudo-noise signal to a third repetition of the first signal to obtain a fourth signal, where the third pseudo-noise signal is based on a second estimated CSI corresponding to the second reference signal, a third gain parameter equal to the first gain parameter and the second gain parameter, and a third phase parameter that is based on the first phase parameter and the second phase parameter. In some cases, the pseudo-noise applier 930 may obtain estimated CSIs 927 from the reference signal receiver 925, which may include the second estimated CSI. In some instances, the pseudo-noise applier 930 may output signals 931 that are generated based on applying pseudo-noise signals to repetitions of the first signal, which may include the fourth signal, to the repetition signal transmitter 935. In some examples, the repetition signal transmitter 935 may be configured as or otherwise support a means for transmitting the fourth signal to the UE.

In some examples, the first gain parameter is different than the second gain parameter based on a second power of the first pseudo-noise signal being less than the first defined power level or greater than the second defined power level when the first gain parameter is equal to the second gain parameter.

In some examples, the second pseudo-noise signal applied to the third signal is based on a second estimated CSI corresponding to a second reference signal received from the UE. In some examples, the first phase parameter is based on whether a first power level of the first reference signal is within a threshold amount of a second power level of the second reference signal.

In some examples, the second pseudo-noise signal applied to the third signal is based on a second estimated CSI corresponding to a second reference signal received from the UE. In some examples, the first gain parameter and the first phase parameter are based on the second gain parameter and the second phase parameter of the second reference signal based on a correlation of the first estimated CSI and the second estimated CSI being less than a threshold.

In some examples, the reference signal request transmitter 940 may be configured as or otherwise support a means for transmitting, to the UE, signaling 941 requesting for the UE to transmit the first reference signal over the first time interval, where receiving the first reference signal from the UE is based on transmitting the signaling.

In some examples, the second pseudo-noise signal applied to the third signal is based on a second estimated CSI corresponding to a second reference signal received from the UE. In some examples, transmitting the signaling requesting for the UE to transmit the first reference signal over the first time interval is based on a predicted correlation between the first estimated CSI and the second estimated CSI being less than a threshold.

In some examples, the second pseudo-noise signal applied to the third signal is based on a second estimated CSI corresponding to a second reference signal received from the UE. In some examples, the first reference signal and the second reference signal are received via different frequency resources, different beam configurations at the network entity, or both based on a correlation between the second estimated CSI and a third predicted CSI corresponding to a third reference signal received from the UE over the first time interval via a same set of frequency resources and a same beam configuration as the second reference signal being greater than a threshold.

In some examples, the second pseudo-noise signal applied to the third signal is based on a second estimated CSI corresponding to a second reference signal received from the UE. In some examples, the first reference signal and the second reference signal are received via a same set of frequency resources and via a same beam configuration at the network entity.

In some examples, the repetition indicator 945 may be configured as or otherwise support a means for transmitting, to the UE and based on transmitting the second signal, signaling 946 indicating that the second signal and the third signal are repetitions of the first signal. In some cases, the repetition indicator 945 may obtain the indication 944 that the second signal and the third signal are repetitions of the first signal from the repetition signal transmitter 935.

Figure 10:
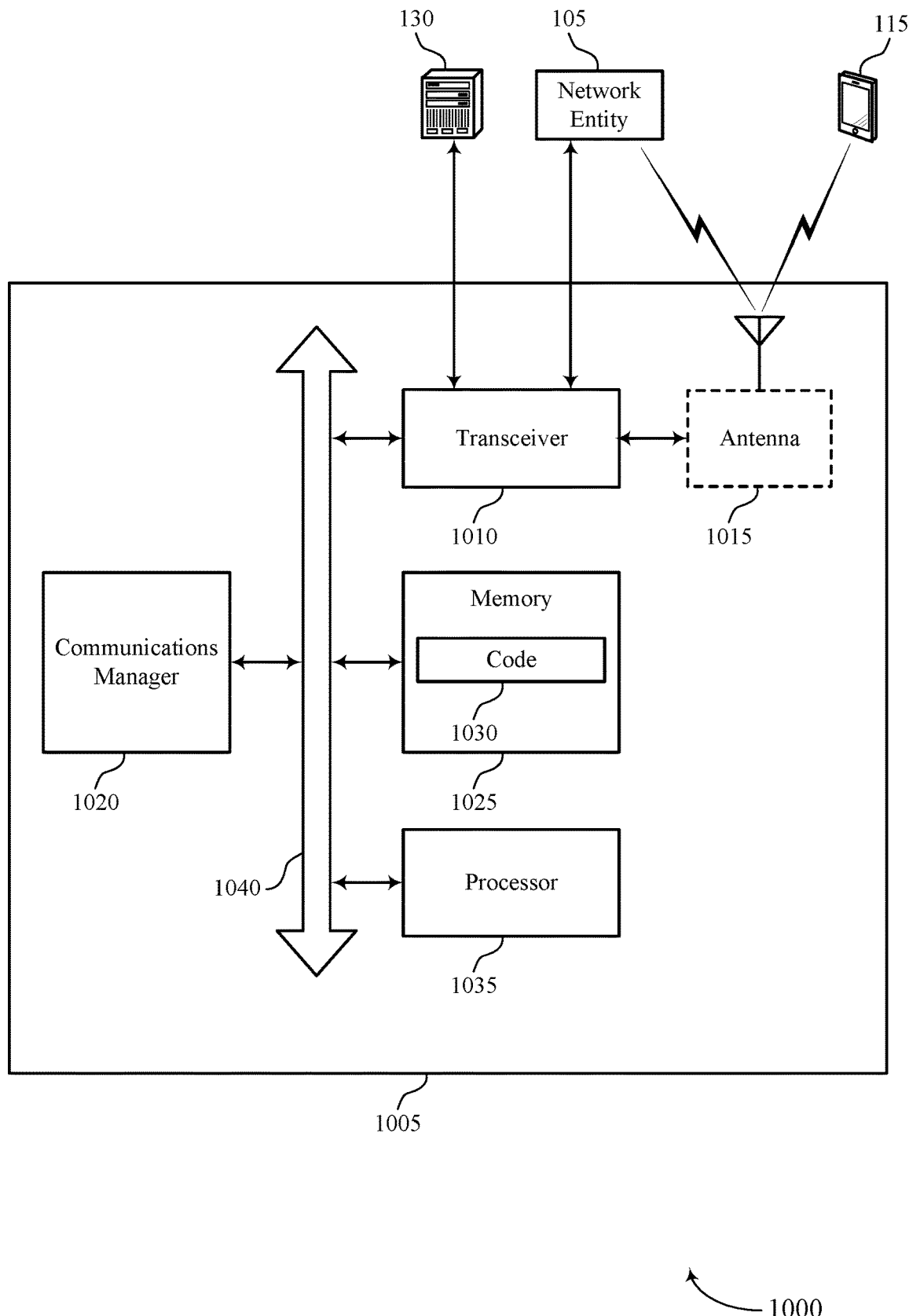
FIG. 10 illustrates a diagram of a system including a device that supports power control for transmissions with time-based artificial noise in accordance with one or more aspects of the present disclosure.

FIG. 10 illustrates a diagram of a system 1000 including a device 1005 that supports power control for transmissions with time-based artificial noise in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting power control for transmissions with time-based artificial noise). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communication at a network entity in accordance with examples as disclosed herein. For example, the communications manager 1020 may be configured as or otherwise support a means for receiving a first reference signal from a UE over a first time interval. The communications manager 1020 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval. The communications manager 1020 may be configured as or otherwise support a means for transmitting the second signal to the UE over a third time interval occurring after the first time interval.

By including or configuring the communications manager 1020 in accordance with examples as described herein, the device 1005 may support techniques for improved communication reliability and reduced power consumption.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of power control for transmissions with time-based artificial noise as described herein, or the processor 1035 and the memory 1025 may be otherwise configured to perform or support such operations.

Figure 11:
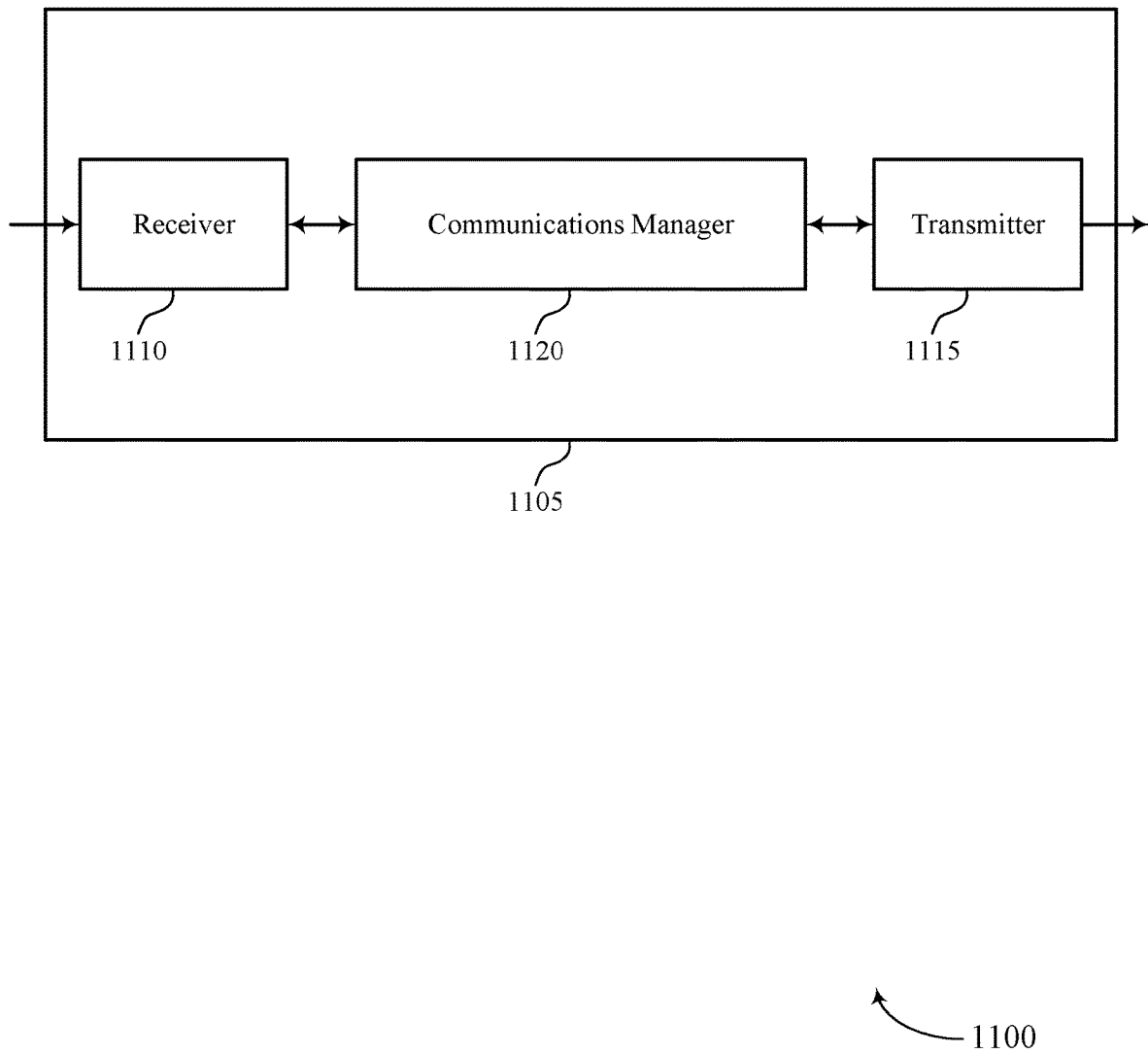
FIGS. 11 and 12 illustrate block diagrams of devices that support power control for transmissions with time-based artificial noise in accordance with one or more aspects of the present disclosure.

FIG. 11 illustrates a block diagram 1100 of a device 1105 that supports power control for transmissions with time-based artificial noise in accordance with one or more aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power control for transmissions with time-based artificial noise). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power control for transmissions with time-based artificial noise). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of power control for transmissions with time-based artificial noise as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor.

If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a UE in accordance with examples as disclosed herein. For example, the communications manager 1120 may be configured as or otherwise support a means for receiving a first reference signal from a network entity over a first time interval. The communications manager 1120 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval. The communications manager 1120 may be configured as or otherwise support a means for transmitting the second signal to the network entity over a third time interval occurring after the first time interval.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced power consumption.

Figure 12:
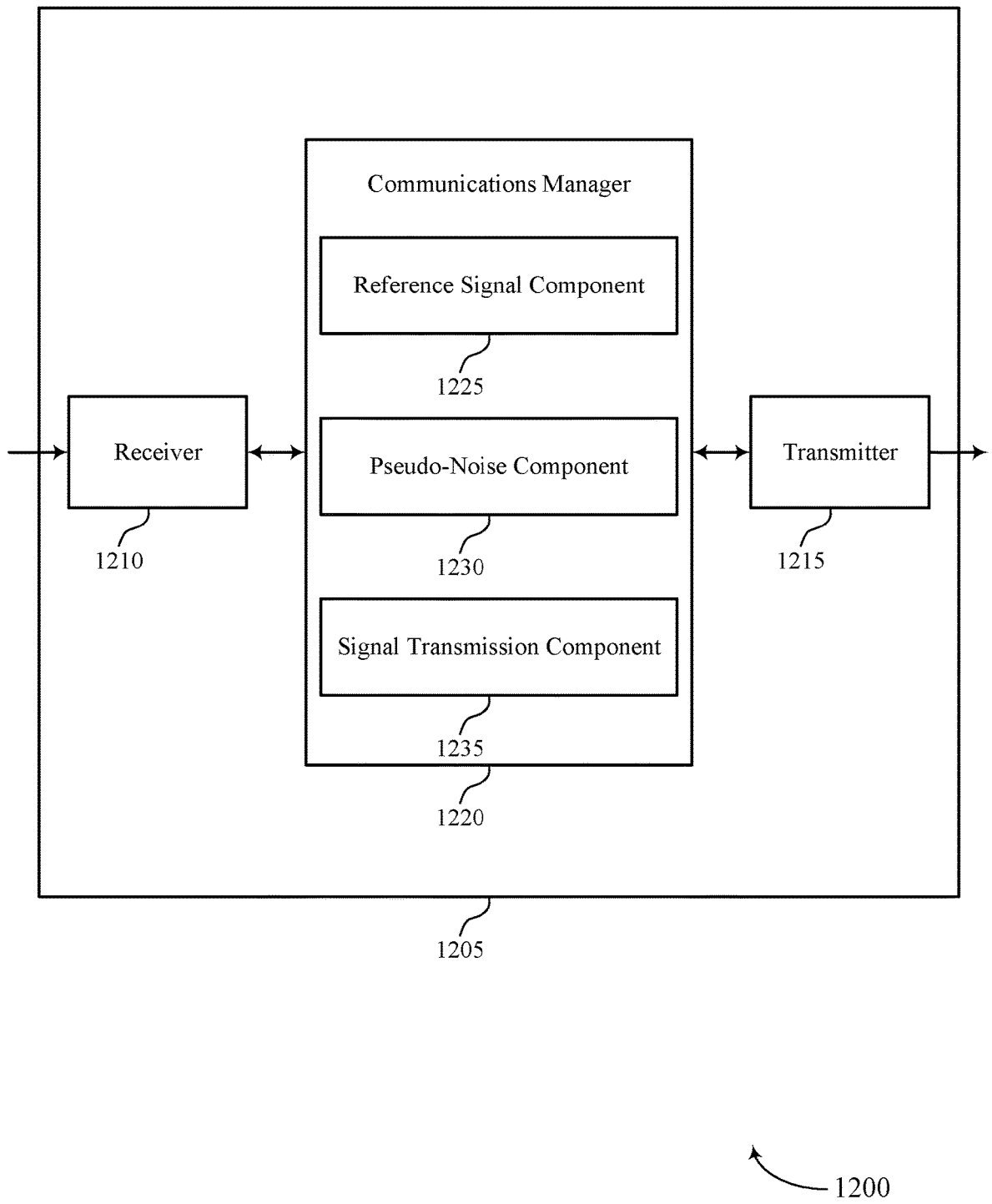

FIG. 12 illustrates a block diagram 1200 of a device 1205 that supports power control for transmissions with time-based artificial noise in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to power control for transmissions with time-based artificial noise). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to power control for transmissions with time-based artificial noise). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of power control for transmissions with time-based artificial noise as described herein. For example, the communications manager 1220 may include a reference signal component 1225, a pseudo-noise component 1230, a signal transmission component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a UE in accordance with examples as disclosed herein. The reference signal component 1225 may be configured as or otherwise support a means for receiving a first reference signal from a network entity over a first time interval. The pseudo-noise component 1230 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval. The signal transmission component 1235 may be configured as or otherwise support a means for transmitting the second signal to the network entity over a third time interval occurring after the first time interval.

Figure 13:
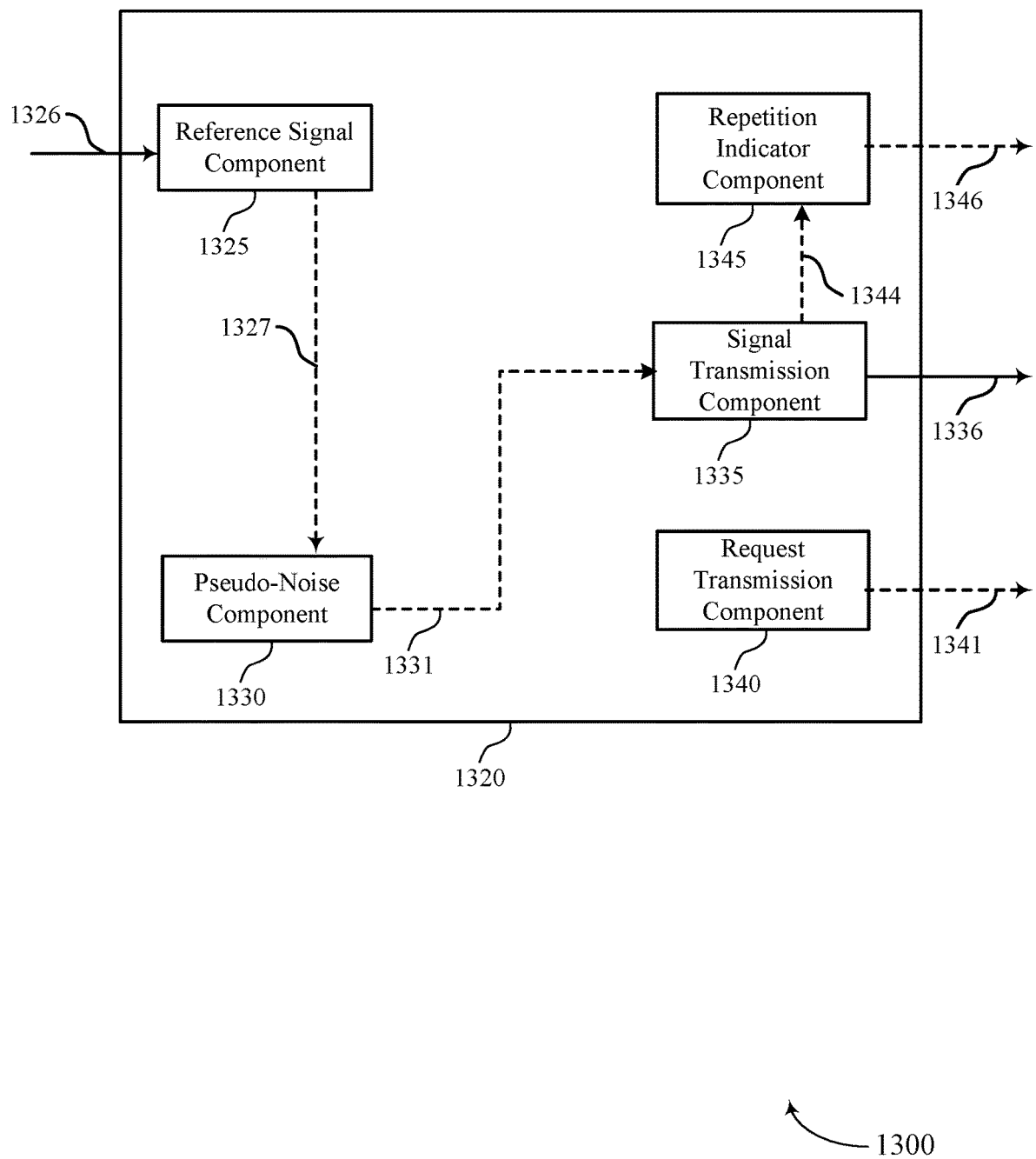
FIG. 13 illustrates a block diagram of a communications manager that supports power control for transmissions with time-based artificial noise in accordance with one or more aspects of the present disclosure.

FIG. 13 illustrates a block diagram 1300 of a communications manager 1320 that supports power control for transmissions with time-based artificial noise in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of power control for transmissions with time-based artificial noise as described herein. For example, the communications manager 1320 may include a reference signal component 1325, a pseudo-noise component 1330, a signal transmission component 1335, a request transmission component 1340, a repetition indicator component 1345, or any combination thereof. Each of these components may communicate, directly or indirectly, with one another (e.g., via one or more buses).

The communications manager 1320 may support wireless communication at a UE in accordance with examples as disclosed herein. The reference signal component 1325 may be configured as or otherwise support a means for receiving a first reference signal from a network entity over a first time interval. For instance, the reference signal component 1325 may obtain reference signals 1326, which may include the first reference signal. The pseudo-noise component 1330 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval. In some cases, the pseudo-noise component 1330 may obtain estimated CSIs 1327 from the reference signal component 1325, which may include the first estimated CSI. In some instances, the pseudo-noise component 1330 may output signals 1331 that are generated based on applying pseudo-noise signals to repetitions of the first signal, which may include the third signal, to the signal transmission component 1335. The signal transmission component 1335 may be configured as or otherwise support a means for transmitting the second signal 1336 to the network entity over a third time interval occurring after the first time interval.

In some examples, a first power level of the first pseudo-noise signal is based on the first gain parameter. In some examples, the first gain parameter is based on the first power level of the first pseudo-noise signal being greater than a first defined power level and less than a second defined power level.

In some examples, the first gain parameter is equal to the second gain parameter based on the first power level of the first pseudo-noise signal being greater than the first defined power level and less than the second defined power level when the first gain parameter is equal to the second gain parameter.

In some examples, the first phase parameter is further based on a third gain parameter and a third phase parameter of a third pseudo-noise signal applied to a third repetition of the first signal to obtain a fourth signal that is transmitted to the network entity over a fourth time interval occurring prior to the first time interval.

In some examples, the reference signal component 1325 may be configured as or otherwise support a means for receiving, after transmitting the second signal to the network entity, a second reference signal from the network entity. For instance, the reference signal component 1325 may obtain reference signals 1326, which may include the second reference signal. In some examples, the pseudo-noise component 1330 may be configured as or otherwise support a means for applying a third pseudo-noise signal to a third repetition of the first signal to obtain a fourth signal, where the third pseudo-noise signal is based on a second estimated CSI corresponding to the second reference signal, a third gain parameter equal to the first gain parameter and the second gain parameter, and a third phase parameter that is based on the first phase parameter and the second phase parameter. In some cases, the pseudo-noise component 1330 may obtain estimated CSIs from the reference signal component 1325, which may include the second estimated CSI. Additionally, the pseudo-noise component 1330 may output, to the signal transmission component 1335, signals 1331, which may include the fourth signal. In some examples, the signal transmission component 1335 may be configured as or otherwise support a means for transmitting the fourth signal to the network entity.

In some examples, the first gain parameter is different than the second gain parameter based on a second power of the first pseudo-noise signal being less than the first defined power level or greater than the second defined power level when the first gain parameter is equal to the second gain parameter.

In some examples, the second pseudo-noise signal applied to the third signal is based on a second estimated CSI corresponding to a second reference signal received from the network entity. In some examples, the first phase parameter is based on whether a first power level of the first reference signal is within a threshold amount of a second power level of the second reference signal.

In some examples, the second pseudo-noise signal applied to the third signal is based on a second estimated CSI corresponding to a second reference signal received from the network entity. In some examples, the first gain parameter and the first phase parameter are based on the second gain parameter and the second phase parameter of the second reference signal based on a correlation of the first estimated CSI and the second estimated CSI being less than a threshold.

In some examples, the request transmission component 1340 may be configured as or otherwise support a means for transmitting, to the network entity, signaling 1341 requesting for the network entity to transmit the first reference signal over the first time interval, where receiving the first reference signal from the network entity is based on transmitting the signaling.

In some examples, the second pseudo-noise signal applied to the third signal is based on a second estimated CSI corresponding to a second reference signal received from the network entity. In some examples, transmitting the signaling requesting for the network entity to transmit the first reference signal over the first time interval is based on a predicted correlation between the first estimated CSI and the second estimated CSI being less than a threshold.

In some examples, the second pseudo-noise signal applied to the third signal is based on a second estimated CSI corresponding to a second reference signal received from the network entity. In some examples, the first reference signal and the second reference signal are received via different frequency resources, different beam configurations at the UE, or both based on a correlation between the second estimated CSI and a third predicted CSI corresponding to a third reference signal received from the network entity over the first time interval via a same set of frequency resources and a same beam configuration as the second reference signal being greater than a threshold.

In some examples, the second pseudo-noise signal applied to the third signal is based on a second estimated CSI corresponding to a second reference signal received from the network entity. In some examples, the first reference signal and the second reference signal are received via a same set of frequency resources and via a same beam configuration at the UE.

In some examples, the repetition indicator component 1345 may be configured as or otherwise support a means for transmitting, to the network entity and based on transmitting the second signal, signaling 1346 indicating that the second signal and the third signal are repetitions of the first signal. In some cases, the repetition indicator component 1345 may obtain the indication 1344 that the second signal and the third signal are repetitions of the first signal from the repetition indicator component 1345.

Figure 14:
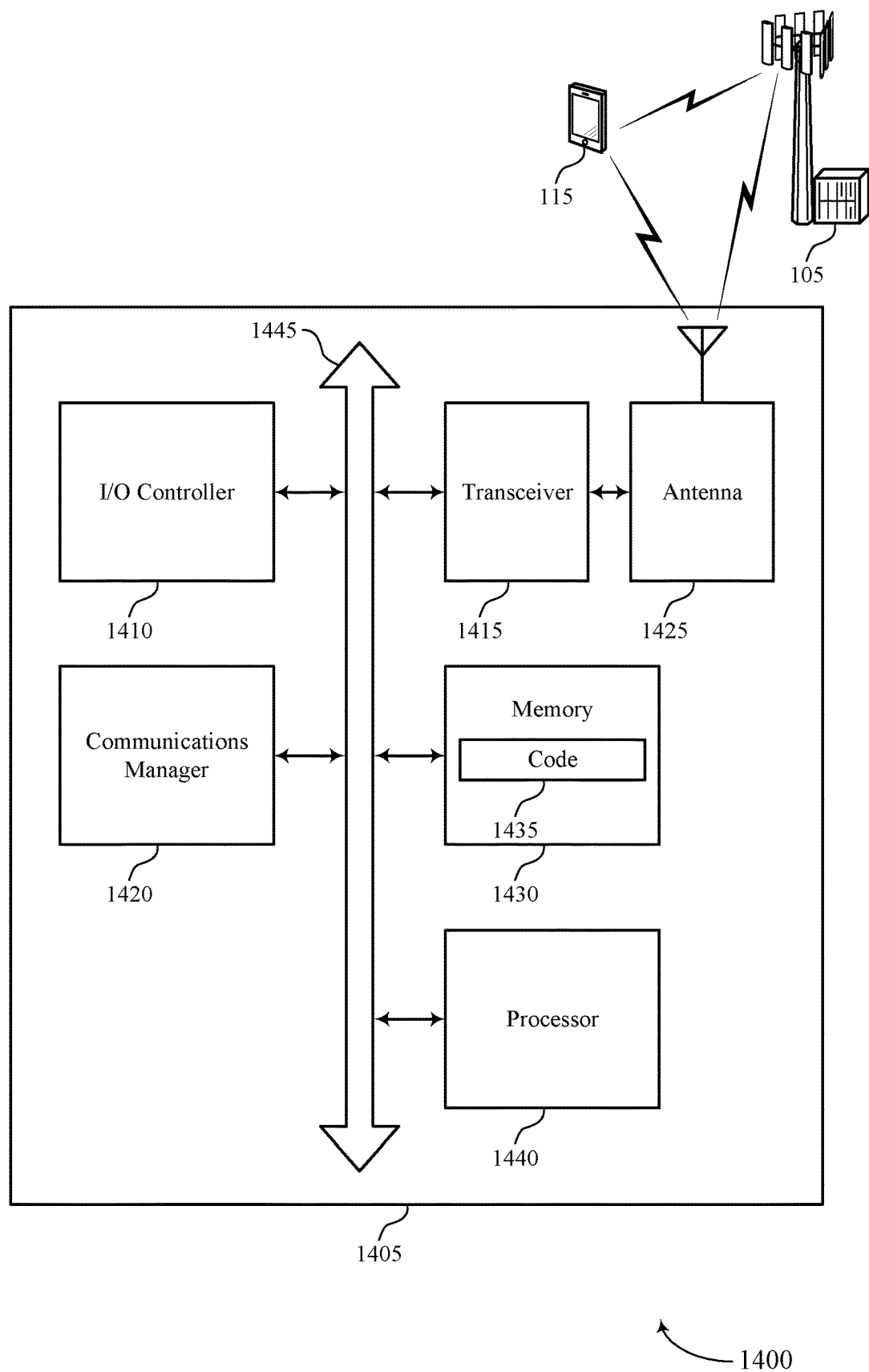
FIG. 14 illustrates a diagram of a system including a device that supports power control for transmissions with time-based artificial noise in accordance with one or more aspects of the present disclosure.

FIG. 14 illustrates a diagram of a system 1400 including a device 1405 that supports power control for transmissions with time-based artificial noise in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting power control for transmissions with time-based artificial noise). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for receiving a first reference signal from a network entity over a first time interval. The communications manager 1420 may be configured as or otherwise support a means for applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval. The communications manager 1420 may be configured as or otherwise support a means for transmitting the second signal to the network entity over a third time interval occurring after the first time interval.

By including or configuring the communications manager 1420 in accordance with examples as described herein, the device 1405 may support techniques for improved communication reliability and security and reduced power consumption.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of power control for transmissions with time-based artificial noise as described herein, or the processor 1440 and the memory 1430 may be otherwise configured to perform or support such operations.

Figure 15:
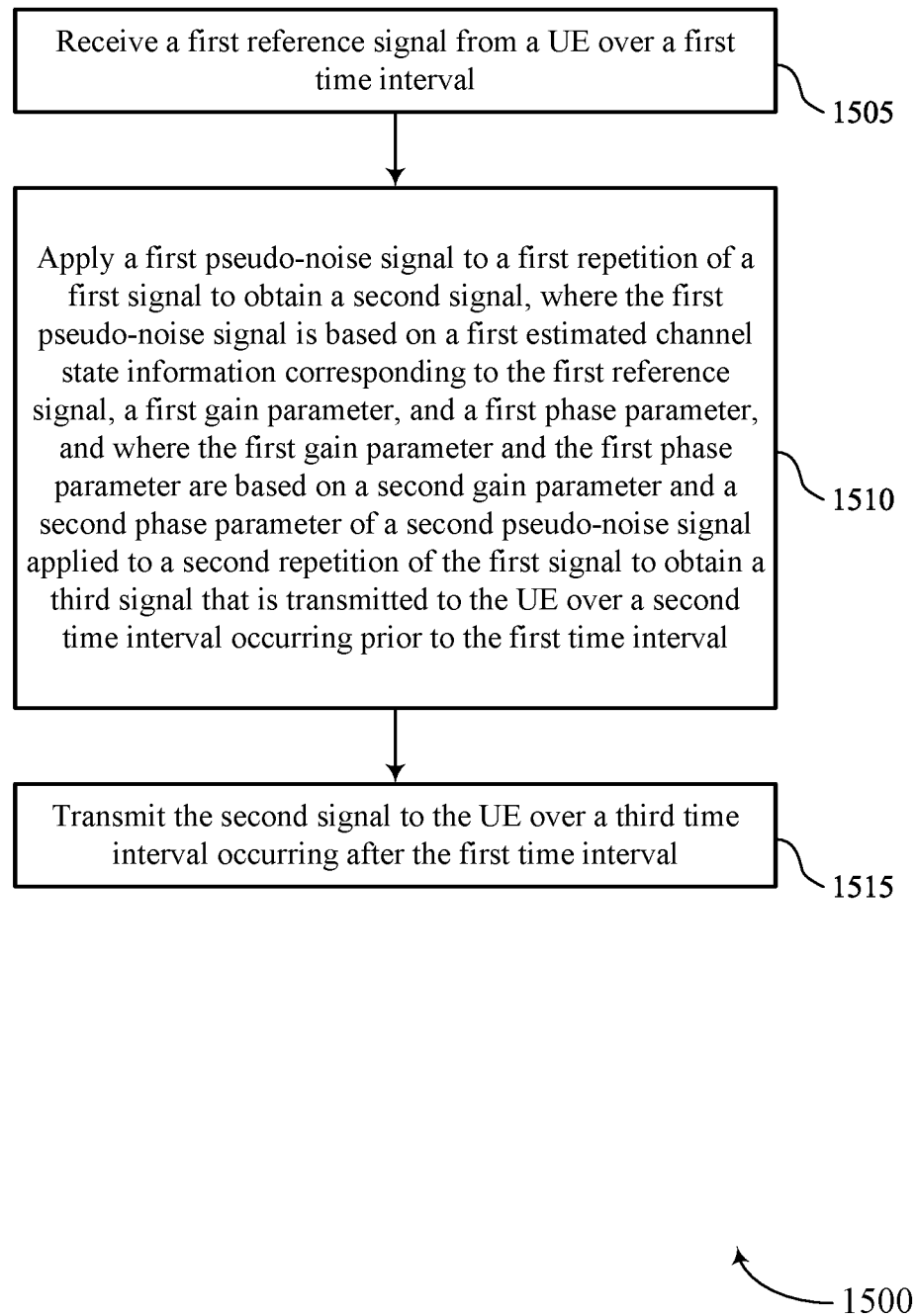
FIGS. 15 through 18 illustrate flowcharts showing methods that support power control for transmissions with time-based artificial noise in accordance with one or more aspects of the present disclosure.

FIG. 15 illustrates a flowchart illustrating a method 1500 that supports power control for transmissions with time-based artificial noise in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include receiving a first reference signal from a UE over a first time interval. The operations of 1505 may be performed in accordance with examples as disclosed herein. In some examples, aspects of the operations of 1505 may be performed by a reference signal receiver 925 as described with reference to FIG. 9. Receiving the first reference signal may include identifying time-frequency resources over which the first reference signal is transmitted, and receiving the first reference signal over those identified time-frequency resources.

At 1510, the method may include applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval. The operations of 1510 may be performed in accordance with examples as disclosed herein. In some examples, aspects of the operations of 1510 may be performed by a pseudo-noise applier 930 as described with reference to FIG. 9. Applying the first pseudo-noise signal to the first repetition of the first signal may include combining the first pseudo-noise signal and the first signal to generate the second signal for transmitting.

At 1515, the method may include transmitting the second signal to the UE over a third time interval occurring after the first time interval. The operations of 1515 may be performed in accordance with examples as disclosed herein. In some examples, aspects of the operations of 1515 may be performed by a repetition signal transmitter 935 as described with reference to FIG. 9. Transmitting the second signal may include identifying time-frequency resources over which each the second signal is transmitted and transmitting the second signal over those identified time-frequency resources.

Figure 16:
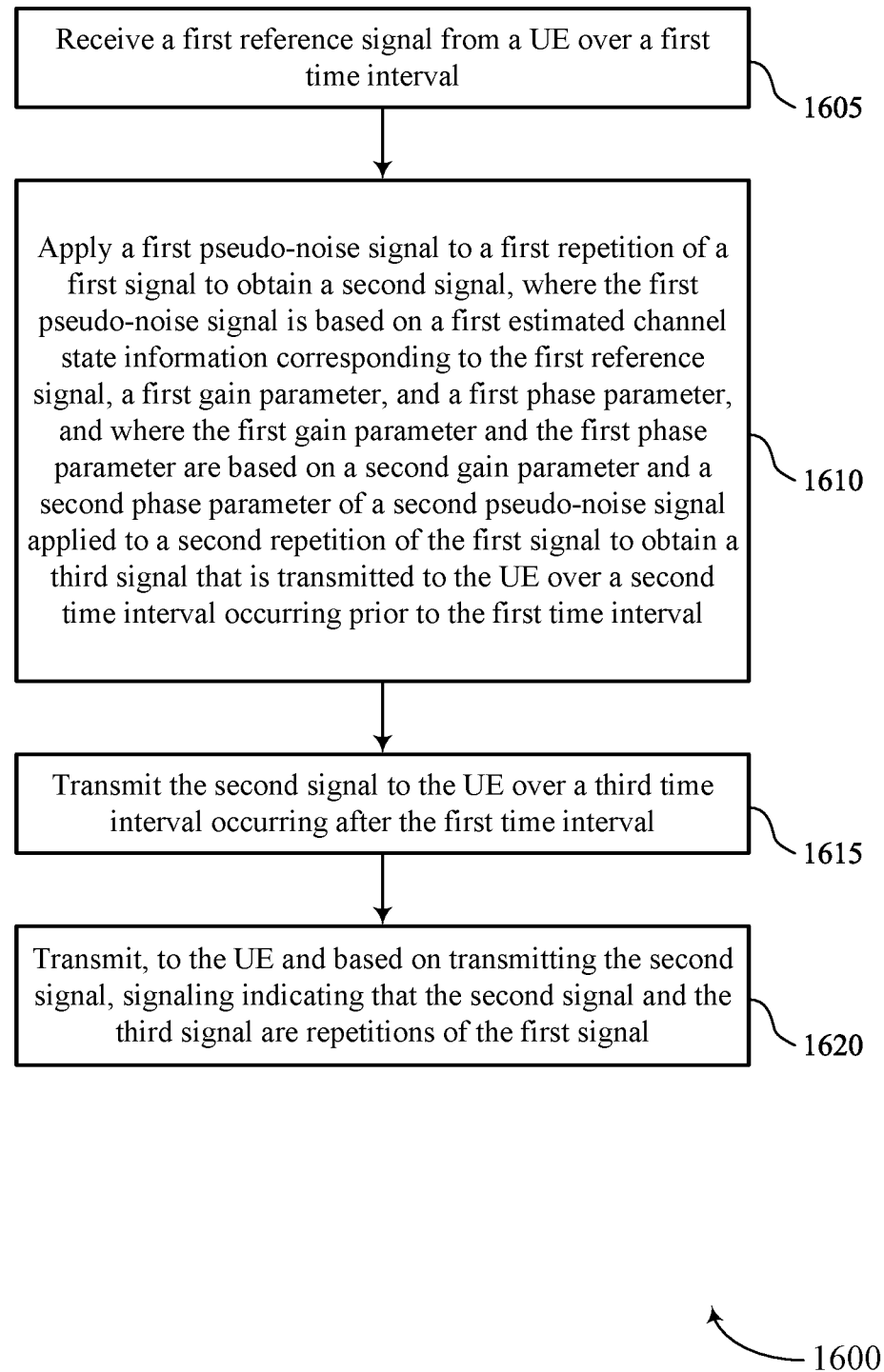

FIG. 16 illustrates a flowchart illustrating a method 1600 that supports power control for transmissions with time-based artificial noise in accordance with one or more aspects of the present disclosure. The operations of the method 1600 may be implemented by a network entity or its components as described herein. For example, the operations of the method 1600 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1605, the method may include receiving a first reference signal from a UE over a first time interval. The operations of 1605 may be performed in accordance with examples as disclosed herein. In some examples, aspects of the operations of 1605 may be performed by a reference signal receiver 925 as described with reference to FIG. 9. Receiving the first reference signal may include identifying time-frequency resources over which the first reference signal is transmitted, and receiving the first reference signal over those identified time-frequency resources.

At 1610, the method may include applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the UE over a second time interval occurring prior to the first time interval. The operations of 1610 may be performed in accordance with examples as disclosed herein. In some examples, aspects of the operations of 1610 may be performed by a pseudo-noise applier 930 as described with reference to FIG. 9. Applying the first pseudo-noise signal to the first repetition of the first signal may include combining the first pseudo-noise signal and the first signal to generate the second signal for transmitting.

At 1615, the method may include transmitting the second signal to the UE over a third time interval occurring after the first time interval. The operations of 1615 may be performed in accordance with examples as disclosed herein. In some examples, aspects of the operations of 1615 may be performed by a repetition signal transmitter 935 as described with reference to FIG. 9. Transmitting the second signal may include identifying time-frequency resources over which the second signal is transmitted and transmitting the second signal over those identified time-frequency resources.

At 1620, the method may include transmitting, to the UE and based on transmitting the second signal, signaling indicating that the second signal and the third signal are repetitions of the first signal. The operations of 1620 may be performed in accordance with examples as disclosed herein. In some examples, aspects of the operations of 1620 may be performed by a repetition indicator 945 as described with reference to FIG. 9. Transmitting the signaling may include identifying time-frequency resources over which the signaling is transmitted and transmitting the signaling over those identified time-frequency resources.

Figure 17:
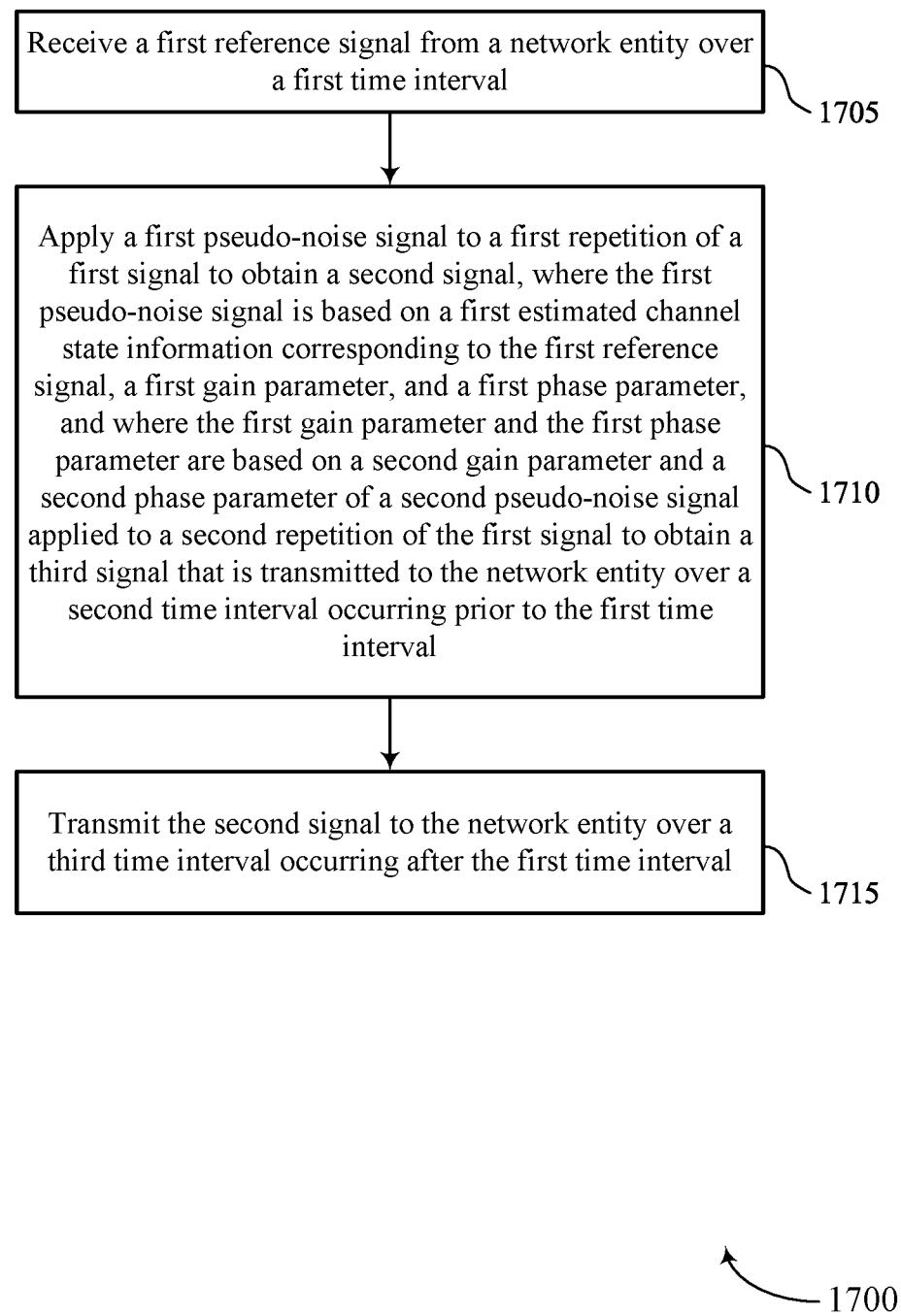

FIG. 17 illustrates a flowchart illustrating a method 1700 that supports power control for transmissions with time-based artificial noise in accordance with one or more aspects of the present disclosure. The operations of the method 1700 may be implemented by a UE or its components as described herein. For example, the operations of the method 1700 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1705, the method may include receiving a first reference signal from a network entity over a first time interval. The operations of 1705 may be performed in accordance with examples as disclosed herein. In some examples, aspects of the operations of 1705 may be performed by a reference signal component 1325 as described with reference to FIG. 13. Receiving the first reference signal may include identifying time-frequency resources over which the first reference signal is transmitted, and receiving the first reference signal over those identified time-frequency resources.

At 1710, the method may include applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval. The operations of 1710 may be performed in accordance with examples as disclosed herein. In some examples, aspects of the operations of 1710 may be performed by a pseudo-noise component 1330 as described with reference to FIG. 13. Applying the first pseudo-noise signal to the first repetition of the first signal may include combining the first pseudo-noise signal and the first signal to generate the second signal for transmitting.

At 1715, the method may include transmitting the second signal to the network entity over a third time interval occurring after the first time interval. The operations of 1715 may be performed in accordance with examples as disclosed herein. In some examples, aspects of the operations of 1715 may be performed by a signal transmission component 1335 as described with reference to FIG. 13. Transmitting the second signal may include identifying time-frequency resources over which the second signal is transmitted and transmitting the second signal over those identified time-frequency resources.

Figure 18:
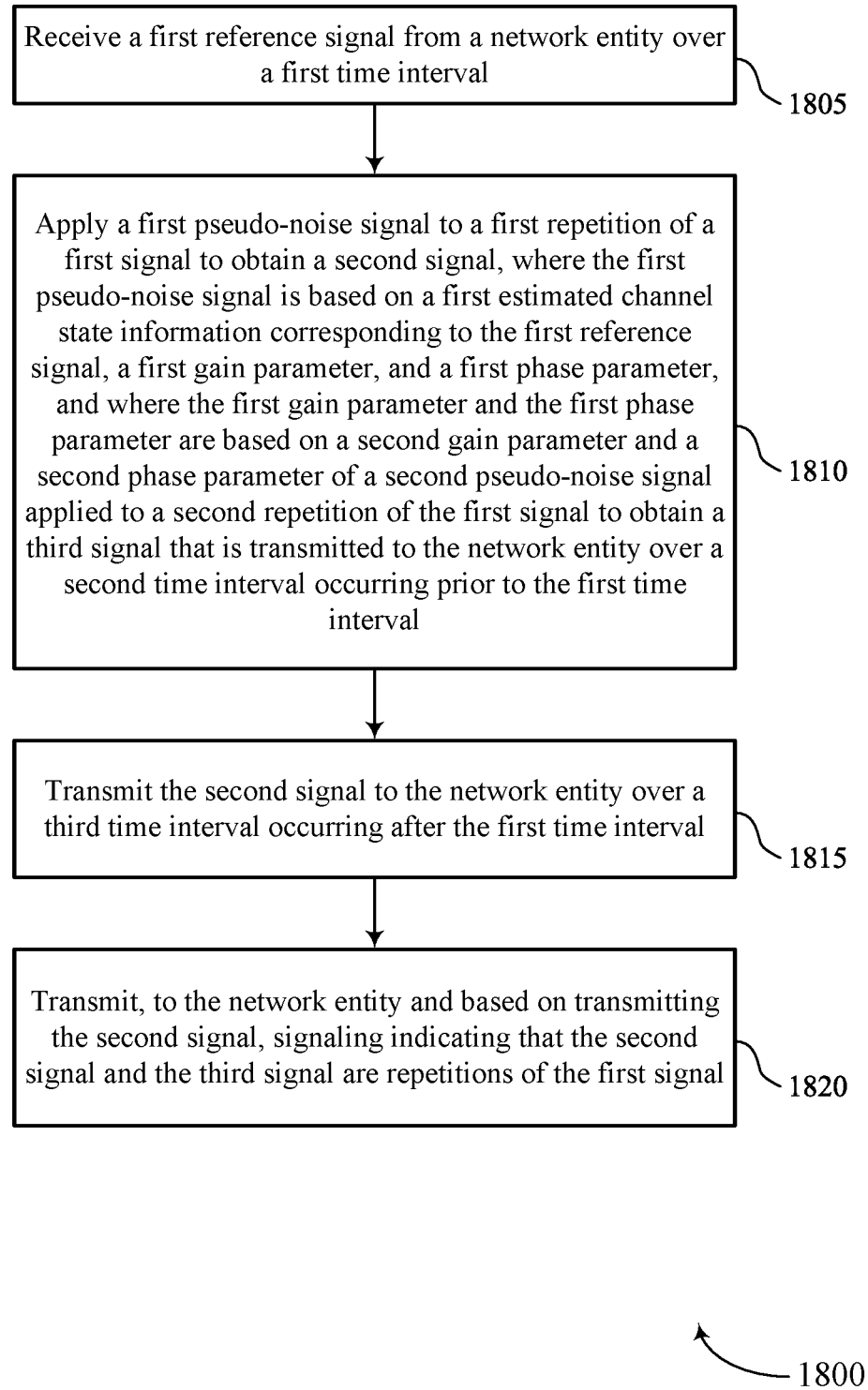

FIG. 18 illustrates a flowchart illustrating a method 1800 that supports power control for transmissions with time-based artificial noise in accordance with one or more aspects of the present disclosure. The operations of the method 1800 may be implemented by a UE or its components as described herein. For example, the operations of the method 1800 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1805, the method may include receiving a first reference signal from a network entity over a first time interval. The operations of 1805 may be performed in accordance with examples as disclosed herein. In some examples, aspects of the operations of 1805 may be performed by a reference signal component 1325 as described with reference to FIG. 13. Receiving the first reference signal may include identifying time-frequency resources over which the first reference signal is transmitted, and receiving the first reference signal over those identified time-frequency resources.

At 1810, the method may include applying a first pseudo-noise signal to a first repetition of a first signal to obtain a second signal, where the first pseudo-noise signal is based on a first estimated CSI corresponding to the first reference signal, a first gain parameter, and a first phase parameter, and where the first gain parameter and the first phase parameter are based on a second gain parameter and a second phase parameter of a second pseudo-noise signal applied to a second repetition of the first signal to obtain a third signal that is transmitted to the network entity over a second time interval occurring prior to the first time interval. The operations of 1810 may be performed in accordance with examples as disclosed herein. In some examples, aspects of the operations of 1810 may be performed by a pseudo-noise component 1330 as described with reference to FIG. 13. Applying the first pseudo-noise signal to the first repetition of the first signal may include combining the first pseudo-noise signal and the first signal to generate the second signal for transmitting.

At 1815, the method may include transmitting the second signal to the network entity over a third time interval occurring after the first time interval. The operations of 1815 may be performed in accordance with examples as disclosed herein. In some examples, aspects of the operations of 1815 may be performed by a signal transmission component 1335 as described with reference to FIG. 13. Transmitting the second signal may include identifying time-frequency resources over which the second signal is transmitted and transmitting the second signal over those identified time-frequency resources.

At 1820, the method may include transmitting, to the network entity and based on transmitting the second signal, signaling indicating that the second signal and the third signal are repetitions of the first signal. The operations of 1820 may be performed in accordance with examples as disclosed herein. In some examples, aspects of the operations of 1820 may be performed by a repetition indicator component 1345 as described with reference to FIG. 13. Transmitting the signaling may include identifying time-frequency resources over which the signaling is transmitted and transmitting the second signal over those identified time-frequency resources.

The following provides an overview of aspects of the present disclosure:

Aspect 1: A method for wireless communication at a network entity, comprising: receiving a first reference signal from a UE over a first time interval; applying a first pseudo-noise signal to a first repetition of a first signal to obtain a second signal, wherein the first pseudo-noise signal is based at least in part on a first estimated channel state information corresponding to the first reference signal, a first gain parameter, and a first phase parameter, and wherein the first gain parameter and the first phase parameter are based at least in part on a second gain parameter and a second phase parameter of a second pseudo-noise signal applied to a second repetition of the first signal to obtain a third signal that is transmitted to the UE over a second time interval occurring prior to the first time interval; and transmitting the second signal to the UE over a third time interval occurring after the first time interval.

Aspect 2: The method of aspect 1, wherein a first power level of the first pseudo-noise signal is based at least in part on the first gain parameter; and the first gain parameter is based at least in part on the first power level of the first pseudo-noise signal being greater than a first defined power level and less than a second defined power level.

Aspect 3: The method of aspect 2, wherein the first gain parameter is equal to the second gain parameter based at least in part on the first power level of the first pseudo-noise signal being greater than the first defined power level and less than the second defined power level when the first gain parameter is equal to the second gain parameter.

Aspect 4: The method of aspect 3, wherein the first phase parameter is further based at least in part on a third gain parameter and a third phase parameter of a third pseudo-noise signal applied to a third repetition of the first signal to obtain a fourth signal that is transmitted to the UE over a fourth time interval occurring prior to the first time interval.

Aspect 5: The method of any of aspects 3 through 4, further comprising: receiving, after transmitting the second signal to the UE, a second reference signal from the UE; applying a third pseudo-noise signal to a third repetition of the first signal to obtain a fourth signal, wherein the third pseudo-noise signal is based at least in part on a second estimated channel state information corresponding to the second reference signal, a third gain parameter equal to the first gain parameter and the second gain parameter, and a third phase parameter that is based at least in part on the first phase parameter and the second phase parameter; and transmitting the fourth signal to the UE.

Aspect 6: The method of aspect 1, wherein the first gain parameter is different than the second gain parameter based at least in part on a second power of the first pseudo-noise signal being less than the first defined power level or greater than the second defined power level when the first gain parameter is equal to the second gain parameter.

Aspect 7: The method of any of aspects 1 through 6, wherein the second pseudo-noise signal applied to the third signal is based at least in part on a second estimated channel state information corresponding to a second reference signal received from the UE; and the first phase parameter is based at least in part on whether a first power level of the first reference signal is within a threshold amount of a second power level of the second reference signal.

Aspect 8: The method of any of aspects 1 through 7, wherein the second pseudo-noise signal applied to the third signal is based at least in part on a second estimated channel state information corresponding to a second reference signal received from the UE; and the first gain parameter and the first phase parameter are based at least in part on the second gain parameter and the second phase parameter of the second reference signal based at least in part on a correlation of the first estimated channel state information and the second estimated channel state information being less than a threshold.

Aspect 9: The method of any of aspects 1 through 8, further comprising: transmitting, to the UE, signaling requesting for the UE to transmit the first reference signal over the first time interval, wherein receiving the first reference signal from the UE is based at least in part on transmitting the signaling.

Aspect 10: The method of aspect 9, wherein the second pseudo-noise signal applied to the third signal is based at least in part on a second estimated channel state information corresponding to a second reference signal received from the UE; and transmitting the signaling requesting for the UE to transmit the first reference signal over the first time interval is based at least in part on a predicted correlation between the first estimated channel state information and the second estimated channel state information being less than a threshold.

Aspect 11: The method of any of aspects 1 through 10, wherein the second pseudo-noise signal applied to the third signal is based at least in part on a second estimated channel state information corresponding to a second reference signal received from the UE; and the first reference signal and the second reference signal are received via different frequency resources, different beam configurations at the network entity, or both based at least in part on a correlation between the second estimated channel state information and a third predicted channel state information corresponding to a third reference signal received from the UE over the first time interval via a same set of frequency resources and a same beam configuration as the second reference signal being greater than a threshold.

Aspect 12: The method of any of aspects 1 through 10, wherein the second pseudo-noise signal applied to the third signal is based at least in part on a second estimated channel state information corresponding to a second reference signal received from the UE; and the first reference signal and the second reference signal are received via a same set of frequency resources and via a same beam configuration at the network entity.

Aspect 13: The method of any of aspects 1 through 12, further comprising: transmitting, to the UE and based at least in part on transmitting the second signal, signaling indicating that the second signal and the third signal are repetitions of the first signal.

Aspect 14: A method for wireless communication at a UE, comprising: receiving a first reference signal from a network entity over a first time interval; applying a first pseudo-noise signal to a first repetition of a first signal to obtain a second signal, wherein the first pseudo-noise signal is based at least in part on a first estimated channel state information corresponding to the first reference signal, a first gain parameter, and a first phase parameter, and wherein the first gain parameter and the first phase parameter are based at least in part on a second gain parameter and a second phase parameter of a second pseudo-noise signal applied to a second repetition of the first signal to obtain a third signal that is transmitted to the network entity over a second time interval occurring prior to the first time interval; and transmitting the second signal to the network entity over a third time interval occurring after the first time interval.

Aspect 15: The method of aspect 14, wherein a first power level of the first pseudo-noise signal is based at least in part on the first gain parameter; and the first gain parameter is based at least in part on the first power level of the first pseudo-noise signal being greater than a first defined power level and less than a second defined power level.

Aspect 16: The method of aspect 15, wherein the first gain parameter is equal to the second gain parameter based at least in part on the first power level of the first pseudo-noise signal being greater than the first defined power level and less than the second defined power level when the first gain parameter is equal to the second gain parameter.

Aspect 17: The method of aspect 16, wherein the first phase parameter is further based at least in part on a third gain parameter and a third phase parameter of a third pseudo-noise signal applied to a third repetition of the first signal to obtain a fourth signal that is transmitted to the network entity over a fourth time interval occurring prior to the first time interval.

Aspect 18: The method of any of aspects 16 through 17, further comprising: receiving, after transmitting the second signal to the network entity, a second reference signal from the network entity; applying a third pseudo-noise signal to a third repetition of the first signal to obtain a fourth signal, wherein the third pseudo-noise signal is based at least in part on a second estimated channel state information corresponding to the second reference signal, a third gain parameter equal to the first gain parameter and the second gain parameter, and a third phase parameter that is based at least in part on the first phase parameter and the second phase parameter; and transmitting the fourth signal to the network entity.

Aspect 19: The method of aspect 14, wherein the first gain parameter is different than the second gain parameter based at least in part on a second power of the first pseudo-noise signal being less than the first defined power level or greater than the second defined power level when the first gain parameter is equal to the second gain parameter.

Aspect 20: The method of any of aspects 14 through 19, wherein the second pseudo-noise signal applied to the third signal is based at least in part on a second estimated channel state information corresponding to a second reference signal received from the network entity; and the first phase parameter is based at least in part on whether a first power level of the first reference signal is within a threshold amount of a second power level of the second reference signal.

Aspect 21: The method of any of aspects 14 through 20, wherein the second pseudo-noise signal applied to the third signal is based at least in part on a second estimated channel state information corresponding to a second reference signal received from the network entity; and the first gain parameter and the first phase parameter are based at least in part on the second gain parameter and the second phase parameter of the second reference signal based at least in part on a correlation of the first estimated channel state information and the second estimated channel state information being less than a threshold.

Aspect 22: The method of any of aspects 14 through 21, further comprising: transmitting, to the network entity, signaling requesting for the network entity to transmit the first reference signal over the first time interval, wherein receiving the first reference signal from the network entity is based at least in part on transmitting the signaling.

Aspect 23: The method of aspect 22, wherein the second pseudo-noise signal applied to the third signal is based at least in part on a second estimated channel state information corresponding to a second reference signal received from the network entity; and transmitting the signaling requesting for the network entity to transmit the first reference signal over the first time interval is based at least in part on a predicted correlation between the first estimated channel state information and the second estimated channel state information being less than a threshold.

Aspect 24: The method of any of aspects 14 through 23, wherein the second pseudo-noise signal applied to the third signal is based at least in part on a second estimated channel state information corresponding to a second reference signal received from the network entity; and the first reference signal and the second reference signal are received via different frequency resources, different beam configurations at the UE, or both based at least in part on a correlation between the second estimated channel state information and a third predicted channel state information corresponding to a third reference signal received from the network entity over the first time interval via a same set of frequency resources and a same beam configuration as the second reference signal being greater than a threshold.

Aspect 25: The method of any of aspects 14 through 23, wherein the second pseudo-noise signal applied to the third signal is based at least in part on a second estimated channel state information corresponding to a second reference signal received from the network entity; and the first reference signal and the second reference signal are received via a same set of frequency resources and via a same beam configuration at the UE.

Aspect 26: The method of any of aspects 14 through 25, further comprising: transmitting, to the network entity and based at least in part on transmitting the second signal, signaling indicating that the second signal and the third signal are repetitions of the first signal.

Aspect 27: An apparatus for wireless communication at a network entity, comprising a processor; memory coupled with the processor; and instructions stored in the memory and executable by the processor to cause the apparatus to perform a method of any of aspects 1 through 13.

Aspect 28: An apparatus for wireless communication at a network entity, comprising at least one means for performing a method of any of aspects 1 through 13.

Aspect 29: A non-transitory computer-readable medium storing code for wireless communication at a network entity, the code comprising instructions executable by a processor to perform a method of any of aspects 1 through 13.

Aspect 30: An apparatus for wireless communication at a UE, comprising a processor; memory coupled with the processor; and instructions stored in the memory and executable by the processor to cause the apparatus to perform a method of any of aspects 14 through 26.

Aspect 31: An apparatus for wireless communication at a UE, comprising at least one means for performing a method of any of aspects 14 through 26.

Aspect 32: A non-transitory computer-readable medium storing code for wireless communication at a UE, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a network entity, comprising:
   a processor;
   memory coupled with the processor; and
   instructions stored in the memory and executable by the processor to cause the apparatus to:
      receive a first reference signal from a user equipment (UE) over a first time interval;
      apply a first pseudo-noise signal to a first repetition of a first signal to obtain a second signal, wherein the first pseudo-noise signal is based at least in part on a first estimated channel state information corresponding to the first reference signal, a first gain parameter, and a first phase parameter, and wherein the first gain parameter and the first phase parameter are based at least in part on a second gain parameter and a second phase parameter of a second pseudo-noise signal applied to a second repetition of the first signal to obtain a third signal that is transmitted to the UE over a second time interval occurring prior to the first time interval; and
      transmit the second signal to the UE over a third time interval occurring after the first time interval.

2. The apparatus of claim 1, wherein:
   a first power level of the first pseudo-noise signal is based at least in part on the first gain parameter; and
   the first gain parameter is based at least in part on the first power level of the first pseudo-noise signal being greater than a first defined power level and less than a second defined power level.

3. The apparatus of claim 2, wherein the first gain parameter is equal to the second gain parameter based at least in part on the first power level of the first pseudo-noise signal being greater than the first defined power level and less than the second defined power level when the first gain parameter is equal to the second gain parameter.

4. The apparatus of claim 3, wherein the first phase parameter is further based at least in part on a third gain parameter and a third phase parameter of a third pseudo-noise signal applied to a third repetition of the first signal to obtain a fourth signal that is transmitted to the UE over a fourth time interval occurring prior to the first time interval.

5. The apparatus of claim 3, wherein the instructions are further executable by the processor to cause the apparatus to:
receive, after transmitting the second signal to the UE, a second reference signal from the UE;
apply a third pseudo-noise signal to a third repetition of the first signal to obtain a fourth signal, wherein the third pseudo-noise signal is based at least in part on a second estimated channel state information corresponding to the second reference signal, a third gain parameter equal to the first gain parameter and the second gain parameter, and a third phase parameter that is based at least in part on the first phase parameter and the second phase parameter; and
transmit the fourth signal to the UE.

6. The apparatus of claim 2, wherein the first gain parameter is different than the second gain parameter based at least in part on a second power of the first pseudo-noise signal being less than the first defined power level or greater than the second defined power level when the first gain parameter is equal to the second gain parameter.

7. The apparatus of claim 1, wherein:
the second pseudo-noise signal applied to the third signal is based at least in part on a second estimated channel state information corresponding to a second reference signal received from the UE; and
the first phase parameter is based at least in part on whether a first power level of the first reference signal is within a threshold amount of a second power level of the second reference signal.

8. The apparatus of claim 1, wherein:
the second pseudo-noise signal applied to the third signal is based at least in part on a second estimated channel state information corresponding to a second reference signal received from the UE; and
the first gain parameter and the first phase parameter are based at least in part on the second gain parameter and the second phase parameter of the second reference signal based at least in part on a correlation of the first estimated channel state information and the second estimated channel state information being less than a threshold.

9. The apparatus of claim 1, wherein the instructions are further executable by the processor to cause the apparatus to:
transmit, to the UE, signaling requesting for the UE to transmit the first reference signal over the first time interval, wherein receiving the first reference signal from the UE is based at least in part on transmitting the signaling.

10. The apparatus of claim 9, wherein:
the second pseudo-noise signal applied to the third signal is based at least in part on a second estimated channel state information corresponding to a second reference signal received from the UE; and
transmitting the signaling requesting for the UE to transmit the first reference signal over the first time interval is based at least in part on a predicted correlation between the first estimated channel state information and the second estimated channel state information being less than a threshold.

11. The apparatus of claim 1, wherein:
the second pseudo-noise signal applied to the third signal is based at least in part on a second estimated channel state information corresponding to a second reference signal received from the UE; and the first reference signal and the second reference signal are received via different frequency resources, different beam configurations at the network entity, or both based at least in part on a correlation between the second estimated channel state information and a third predicted channel state information corresponding to a third reference signal received from the UE over the first time interval via a same set of frequency resources and a same beam configuration as the second reference signal being greater than a threshold.

12. The apparatus of claim 1, wherein:
the second pseudo-noise signal applied to the third signal is based at least in part on a second estimated channel state information corresponding to a second reference signal received from the UE; and
the first reference signal and the second reference signal are received via a same set of frequency resources and via a same beam configuration at the network entity.

13. The apparatus of claim 1, wherein the instructions are further executable by the processor to cause the apparatus to:
transmit, to the UE and based at least in part on transmitting the second signal, signaling indicating that the second signal and the third signal are repetitions of the first signal.

14. An apparatus for wireless communication at a user equipment (UE), comprising:
a processor;
memory coupled with the processor; and
instructions stored in the memory and executable by the processor to cause the apparatus to:
receive a first reference signal from a network entity over a first time interval;
apply a first pseudo-noise signal to a first repetition of a first signal to obtain a second signal, wherein the first pseudo-noise signal is based at least in part on a first estimated channel state information corresponding to the first reference signal, a first gain parameter, and a first phase parameter, and wherein the first gain parameter and the first phase parameter are based at least in part on a second gain parameter and a second phase parameter of a second pseudo-noise signal applied to a second repetition of the first signal to obtain a third signal that is transmitted to the network entity over a second time interval occurring prior to the first time interval; and
transmit the second signal to the network entity over a third time interval occurring after the first time interval.

15. The apparatus of claim 14, wherein:
a first power level of the first pseudo-noise signal is based at least in part on the first gain parameter; and
the first gain parameter is based at least in part on the first power level of the first pseudo-noise signal being greater than a first defined power level and less than a second defined power level.

16. The apparatus of claim 15, wherein the first gain parameter is equal to the second gain parameter based at least in part on the first power level of the first pseudo-noise signal being greater than the first defined power level and less than the second defined power level when the first gain parameter is equal to the second gain parameter.

17. The apparatus of claim 16, wherein the first phase parameter is further based at least in part on a third gain parameter and a third phase parameter of a third pseudo-noise signal applied to a third repetition of the first signal to obtain a fourth signal that is transmitted to the network entity over a fourth time interval occurring prior to the first time interval.

18. The apparatus of claim 16, wherein the instructions are further executable by the processor to cause the apparatus to:
receive, after transmitting the second signal to the network entity, a second reference signal from the network entity;
apply a third pseudo-noise signal to a third repetition of the first signal to obtain a fourth signal, wherein the third pseudo-noise signal is based at least in part on a second estimated channel state information corresponding to the second reference signal, a third gain parameter equal to the first gain parameter and the second gain parameter, and a third phase parameter that is based at least in part on the first phase parameter and the second phase parameter; and
transmit the fourth signal to the network entity.

19. The apparatus of claim 15, wherein the first gain parameter is different than the second gain parameter based at least in part on a second power of the first pseudo-noise signal being less than the first defined power level or greater than the second defined power level when the first gain parameter is equal to the second gain parameter.

20. The apparatus of claim 14, wherein:
the second pseudo-noise signal applied to the third signal is based at least in part on a second estimated channel state information corresponding to a second reference signal received from the network entity; and
the first phase parameter is based at least in part on whether a first power level of the first reference signal is within a threshold amount of a second power level of the second reference signal.

21. The apparatus of claim 14, wherein:
the second pseudo-noise signal applied to the third signal is based at least in part on a second estimated channel state information corresponding to a second reference signal received from the network entity; and
the first gain parameter and the first phase parameter are based at least in part on the second gain parameter and the second phase parameter of the second reference signal based at least in part on a correlation of the first estimated channel state information and the second estimated channel state information being less than a threshold.

22. The apparatus of claim 14, wherein the instructions are further executable by the processor to cause the apparatus to:
transmit, to the network entity, signaling requesting for the network entity to transmit the first reference signal over the first time interval, wherein receiving the first reference signal from the network entity is based at least in part on transmitting the signaling.

23. The apparatus of claim 22, wherein:
the second pseudo-noise signal applied to the third signal is based at least in part on a second estimated channel state information corresponding to a second reference signal received from the network entity; and
transmitting the signaling requesting for the network entity to transmit the first reference signal over the first time interval is based at least in part on a predicted correlation between the first estimated channel state information and the second estimated channel state information being less than a threshold.

24. The apparatus of claim 14, wherein:
the second pseudo-noise signal applied to the third signal is based at least in part on a second estimated channel state information corresponding to a second reference signal received from the network entity; and
the first reference signal and the second reference signal are received via different frequency resources, different beam configurations at the UE, or both based at least in part on a correlation between the second estimated channel state information and a third predicted channel state information corresponding to a third reference signal received from the network entity over the first time interval via a same set of frequency resources and a same beam configuration as the second reference signal being greater than a threshold.

25. The apparatus of claim 14, wherein:
the second pseudo-noise signal applied to the third signal is based at least in part on a second estimated channel state information corresponding to a second reference signal received from the network entity; and
the first reference signal and the second reference signal are received via a same set of frequency resources and via a same beam configuration at the UE.

26. The apparatus of claim 14, wherein the instructions are further executable by the processor to cause the apparatus to:
transmit, to the network entity and based at least in part on transmitting the second signal, signaling indicating that the second signal and the third signal are repetitions of the first signal.

27. A method for wireless communication at a network entity, comprising:
receiving a first reference signal from a user equipment (UE) over a first time interval;
applying a first pseudo-noise signal to a first repetition of a first signal to obtain a second signal, wherein the first pseudo-noise signal is based at least in part on a first estimated channel state information corresponding to the first reference signal, a first gain parameter, and a first phase parameter, and wherein the first gain parameter and the first phase parameter are based at least in part on a second gain parameter and a second phase parameter of a second pseudo-noise signal applied to a second repetition of the first signal to obtain a third signal that is transmitted to the UE over a second time interval occurring prior to the first time interval; and
transmitting the second signal to the UE over a third time interval occurring after the first time interval.

28. The method of claim 27, wherein:
a first power level of the first pseudo-noise signal is based at least in part on the first gain parameter; and
the first gain parameter is based at least in part on the first power level of the first pseudo-noise signal being greater than a first defined power level and less than a second defined power level.

29. A method for wireless communication at a user equipment (UE), comprising:
receiving a first reference signal from a network entity over a first time interval;
applying a first pseudo-noise signal to a first repetition of a first signal to obtain a second signal, wherein the first pseudo-noise signal is based at least in part on a first estimated channel state information corresponding to the first reference signal, a first gain parameter, and a first phase parameter, and wherein the first gain parameter and the first phase parameter are based at least in part on a second gain parameter and a second phase parameter of a second pseudo-noise signal applied to a second repetition of the first signal to obtain a third signal that is transmitted to the network entity over a second time interval occurring prior to the first time interval; and transmitting the second signal to the network entity over a third time interval occurring after the first time interval.

30. The method of claim 29, wherein:

a first power level of the first pseudo-noise signal is based at least in part on the first gain parameter; and the first gain parameter is based at least in part on the first power level of the first pseudo-noise signal being greater than a first defined power level and less than a second defined power level.

* * * * *